United States Patent
Lee et al.

(10) Patent No.: US 12,284,625 B2
(45) Date of Patent: Apr. 22, 2025

(54) ELECTRONIC DEVICE AND METHOD FOR REGISTERING IN COMMUNICATION NETWORK BY ELECTRONIC DEVICE SUPPORTING MULTIPLE SIMS

(71) Applicant: Samsung Electronics Co., Ltd., Suwon-si (KR)

(72) Inventors: Kyoungho Lee, Suwon-si (KR); Sukkyung Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 506 days.

(21) Appl. No.: 17/673,282

(22) Filed: Feb. 16, 2022

(65) Prior Publication Data

US 2022/0264511 A1    Aug. 18, 2022

Related U.S. Application Data

(63) Continuation of application No. PCT/KR2022/002032, filed on Feb. 10, 2022.

(30) Foreign Application Priority Data

Feb. 16, 2021   (KR) .................. 10-2021-0020570

(51) Int. Cl.
*H04W 60/04*       (2009.01)
*H04W 8/18*        (2009.01)
(Continued)

(52) U.S. Cl.
CPC .......... *H04W 60/04* (2013.01); *H04W 8/183* (2013.01); *H04W 68/005* (2013.01); *H04W 76/20* (2018.02); *H04W 76/30* (2018.02)

(58) Field of Classification Search
CPC ... H04W 60/04; H04W 8/183; H04W 68/005; H04W 76/20; H04W 76/30; H04W 76/18; H04W 76/38; H04W 60/005
(Continued)

(56) References Cited

U.S. PATENT DOCUMENTS

| 2010/0062747 | A1* | 3/2010 | Harris | H04L 12/1895 |
| | | | | 455/435.1 |
| 2010/0167755 | A1* | 7/2010 | Kim | H04W 48/18 |
| | | | | 455/456.1 |

(Continued)

FOREIGN PATENT DOCUMENTS

| EP | 2568731 A1 * | 3/2013 | ............ H04W 4/003 |
| JP | 2020-512762 A | 4/2020 | |

(Continued)

OTHER PUBLICATIONS

International Search Report dated May 19, 2022, issued in International Application No. PCT/KR2022/002032.

*Primary Examiner* — Hashim S Bhatti
*Assistant Examiner* — Oladiran Gideon Olaleye
(74) *Attorney, Agent, or Firm* — Jefferson IP Law, LLP

(57) ABSTRACT

An electronic device is provided. The electronic device includes at least one processor connected with a first subscriber identity module (SIM) and a second SIM and at least one radio frequency (RF) circuit. The at least one processor is configured to receive an RRC connection release message after radio resource control (RRC) connection with the first communication network to transmit/receive data in the state where the use of the at least one RF circuit is allocated to the first SIM, and retransmit a registration request message for the second communication network to the base station of the second communication network in the state where the use of the at least one RF circuit is allocated to the second SIM in (Continued)

response to the reception of the RRC connection release message.

14 Claims, 16 Drawing Sheets

(51) Int. Cl.
*H04W 68/00* (2009.01)
*H04W 76/20* (2018.01)
*H04W 76/30* (2018.01)

(58) Field of Classification Search
USPC .......................................................... 370/406
See application file for complete search history.

(56) References Cited

U.S. PATENT DOCUMENTS

| | | | |
|---|---|---|---|
| 2012/0219127 A1* | 8/2012 | Lu | H04L 65/1073 379/90.01 |
| 2014/0220981 A1* | 8/2014 | Jheng | H04W 76/15 455/437 |
| 2015/0230070 A1* | 8/2015 | Kadiyala | H04W 72/02 455/552.1 |
| 2016/0142087 A1 | 5/2016 | Inampudi et al. | |
| 2016/0249408 A1 | 8/2016 | Thiruvenkatachari et al. | |
| 2020/0037281 A1* | 1/2020 | Lee | H04W 36/00226 |
| 2020/0037380 A1 | 1/2020 | Qiu et al. | |
| 2020/0092836 A1* | 3/2020 | Tiwari | H04W 12/02 |
| 2020/0336891 A1 | 10/2020 | Guo et al. | |
| 2020/0396714 A1 | 12/2020 | Lee | |

FOREIGN PATENT DOCUMENTS

| | | | | |
|---|---|---|---|---|
| KR | 10-2019-0101811 A | 9/2019 | | |
| KR | 10-2019-0131547 A | 11/2019 | | |
| KR | 10-2020-0122229 A | 10/2020 | | |
| KR | 10-2022-0009297 A | 1/2022 | | |
| KR | 10-2022-0041580 A | 4/2022 | | |
| WO | 2017/143609 A1 | 8/2017 | | |
| WO | 2018/053312 A1 | 3/2018 | | |
| WO | WO-2020247043 A1 * | 12/2020 | ............ | H04W 12/45 |

* cited by examiner

ELECTRONIC DEVICE AND METHOD FOR REGISTERING IN COMMUNICATION NETWORK BY ELECTRONIC DEVICE SUPPORTING MULTIPLE SIMS

CROSS-REFERENCE TO RELATED APPLICATION(S)

This application is a continuation application, claiming priority under § 365(c), of an International application No. PCT/KR2022/002032, filed on Feb. 10, 2022, which is based on and claims the benefit of a Korean patent application number 10-2021-0020570, filed on Feb. 16, 2021, in the Korean Intellectual Property Office, the disclosure of which is incorporated by reference herein in its entirety.

TECHNICAL FIELD

The disclosure relates to an electronic device and a method for registering in a communication network by an electronic device supporting multiple subscriber identity modules (SIMs).

BACKGROUND ART

In a wireless communication system, an electronic device (e.g., user equipment (UE)) may access a wireless communication network and use a voice communication or data communication service in a fixed position or on the move. To provide a communication service to an electronic device, an appropriate authentication process is required. In general, a universal integrated circuit card (UICC) is inserted into the electronic device, and authentication is performed between the electronic device and the server of the mobile network operator (MNO) through a universal subscriber identity module (USIM) installed in the UICC. UICC may be called subscriber identity module (SIM) in the case of global system for mobile communications (GSM) and USIM in the case of wideband code division multiple access (WCDMA), long term evolution (LTE), and new radio (NR).

If the user of the electronic device subscribes to a wireless communication service provided by the mobile network operator, the mobile network operator may provide a UICC (e.g., a SIM card or a USIM card) to the user. The user may insert the provided UICC into her electronic device. If the UICC is inserted into the electronic device, the USIM application installed in the UICC is executed, and an appropriate authentication process may be performed with the server the mobile network operator, which stores the same value, using to the international mobile subscriber identity (IMSI) value stored in the UICC and the encryption key value for authentication. After the appropriate authentication process is performed, the wireless communication service may be used.

An electronic device may support two or more SIMs. An electronic device supporting two SIMs may be called a dual SIM electronic device, and an electronic device supporting multiple SIMs may be called a multi-SIM electronic device. A dual SIM or multi-SIM electronic device may support a plurality of SIMs. Each SIM may be associated with a different subscription.

For example, a device in which one transceiver transmits and receives signals associated with a plurality of SIMs may be referred to as a dual-SIM dual-standby (DSDS) device. In this case, if one SIM transmits or receives a signal, the other SIM may be in the standby mode. Alternatively, a device capable of simultaneous activation of both the SIMs may be referred to as a dual-SIM dual-active (DSDA) device.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

A dual SIM-supported electronic device may be connected to at least two cellular networks. When the dual SIM-supported electronic device operates as a dual-SIM dual-standby (DSDS) device, an operation for allocating a radio frequency (RF) resource (e.g., a power amplifier, a low-noise amplifier, or an antenna) of the electronic device to the second SIM may be required to connect the second SIM to a second communication network while the first SIM is connected with a first communication network. The electronic device may perform a registration procedure of the second communication network on the second SIM based on the allocated RF resource.

For example, the electronic device may allocate the RF resource to the first SIM according to preset priority and transmit/receive data to/from the first communication network while performing the registration procedure of the second communication network on the second SIM. Although reallocating an RF resource to the second SIM after data transmission/reception with the first communication network, the electronic device may wait for retransmission of a registration request until a set timer expires since normal registration is not complete due to the stopped period of the RF resource. Since the electronic device has an unnecessary waiting time until the set timer expires, registration in the second communication network may be delayed.

Aspects of the disclosure are to address at least the above-mentioned problems and/or disadvantages and to provide at least the advantages described below. Accordingly, an aspect of the disclosure is to provide an electronic device capable of retransmitting a registration request without waiting until the operating timer expires even when normal registration is not complete due to data transmission/reception for the first SIM after the electronic device operating in DSDS proceeds with registration of the second SIM after completing registration for the first SIM and a method for registering in a communication network by an electronic device supporting a plurality of SIMs.

Additional aspects will be set forth in part in the description which follows and, in part, will be apparent from the description, or may be learned by practice of the presented embodiments.

Technical Solution

In accordance with an aspect of the disclosure, an electronic device is provided. The electronic device includes at least one processor connected with a first subscriber identity module (SIM) and a second SIM and at least one radio frequency (RF) circuit used for communication based on the first SIM and communication based on the second SIM. The at least one processor may be configured to complete registration for a first communication network corresponding to the first SIM in a state where use of the at least one RF circuit is allocated to the first SIM, control to transmit a registration request message for a second communication network corresponding to the second SIM to a base station of the second communication network in a state where the use of the at least one RF circuit is allocated to the second SIM, control to allocate the use of the at least one RF circuit to the first SIM at a time of identifying a reception signal for the first communication network while performing the registration for the second communication network, receive an RRC connection release message after radio resource control (RRC) connection with the first communication network to transmit/receive data in the state where the use of the at least one RF circuit is allocated to the first SIM, and retransmit a registration request message for the second communication network to the base station of the second communication network in the state where the use of the at least one RF circuit is allocated to the second SIM in response to the reception of the RRC connection release message.

In accordance with another aspect of the disclosure, a method for registering in a communication network by an electronic device is provided. The method includes at least one processor connected with a first subscriber identity module (SIM) and a second SIM and at least one radio frequency (RF) circuit used for communication based on the first SIM and communication based on the second SIM may comprise completing registration for a first communication network corresponding to the first SIM in a state where use of the at least one RF circuit is allocated to the first SIM, transmitting a registration request message for a second communication network corresponding to the second SIM to a base station of the second communication network in a state where the use of the at least one RF circuit is allocated to the second SIM, controlling to allocate the use of the at least one RF circuit to the first SIM at a time of identifying a reception signal for the first communication network while performing the registration for the second communication network, receiving an RRC connection release message after radio resource control (RRC) connection with the first communication network to transmit/receive data in the state where the use of the at least one RF circuit is allocated to the first SIM, and retransmitting a registration request message for the second communication network to the base station of the second communication network in the state where the use of the at least one RF circuit is allocated to the second SIM in response to the reception of the RRC connection release message.

Advantageous Effects

According to various embodiments of the disclosure, the electronic device operating in DSDS may prevent a delay of registration time by retransmitting a registration request without waiting until the running timer expires although normal registration is not complete due to data transmission/reception for the first SIM while proceeding with registration of the second SIM.

Other aspects, advantages, and salient features of the disclosure will become apparent to those skilled in the art from the following detailed description, which, taken in conjunction with the annexed drawings, discloses various embodiments of the disclosure.

DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR INVENTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
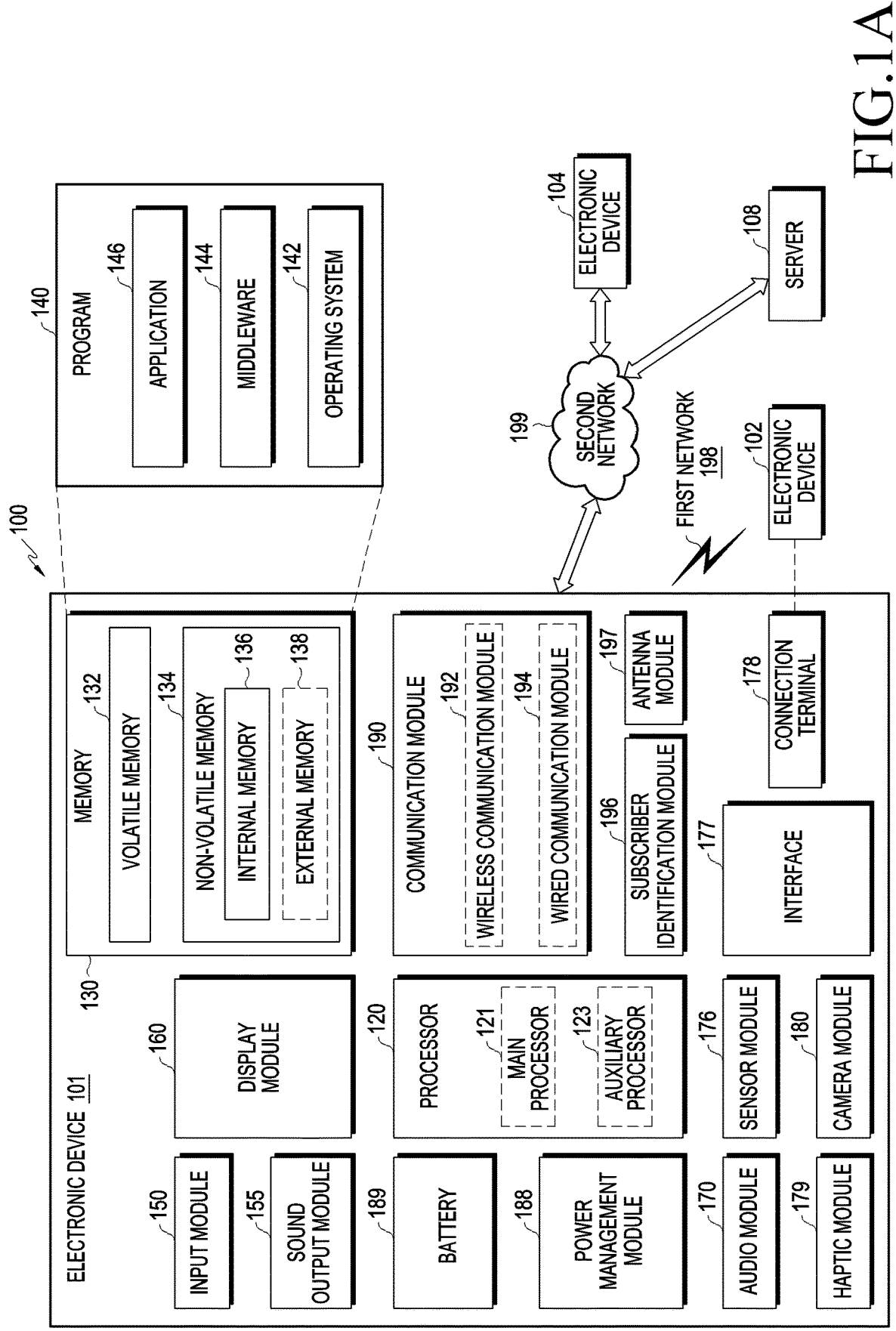
FIG. 1A is a block diagram illustrating an electronic device in a network environment according to an embodiment of the disclosure.

FIG. 1A is a block diagram illustrating an electronic device in a network environment according to an embodiment of the disclosure.

Referring to FIG. 1A, an electronic device 101 in a network environment 100 may communicate with an external electronic device 102 via a first network 198 (e.g., a short-range wireless communication network), or an external electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identity module (SIM) 196, or an antenna module 197. In some embodiments of the disclosure, at least one (e.g., the connecting terminal 178) of the components may be omitted from the electronic device 101, or one or more other components may be added in the electronic device 101. According to an embodiment of the disclosure, some (e.g., the sensor module 176, the camera module 180, or the antenna module 197) of the components may be integrated into a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be configured to use lower power than the main processor 121 or to be specified for a designated function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. The artificial intelligence model may be generated via machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by other component (e.g., the processor 120) of the electronic device 101, from the outside (e.g., a user) of the electronic device 101. The input module 150 may include, for example, a microphone, a mouse, a keyboard, keys (e.g., buttons), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor configured to detect a touch, or a pressure sensor configured to measure the intensity of a force generated by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., an external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via a first network 198 (e.g., a short-range communication network, such as Bluetooth™, wireless-fidelity (Wi-Fi) direct, or infrared data association (IrDA)) or a second network 199 (e.g., a long-range communication network, such as a legacy cellular network, a 5G network, a next-generation communication network, the Internet, or a computer network (e.g., local area network (LAN) or wide area network (WAN))). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identity module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device). According to an embodiment of the disclosure, the antenna module 197 may include one antenna including a radiator formed of a conductor or conductive pattern formed on a substrate (e.g., a printed circuit board (PCB)). According to an embodiment of the disclosure, the antenna module 197 may include a plurality of antennas (e.g., an antenna array). In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment of the disclosure, other parts (e.g., radio frequency integrated circuit (RFIC)) than the radiator may be further formed as part of the antenna module 197.

According to various embodiments of the disclosure, the antenna module 197 may form a mmWave antenna module. According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. The external electronic devices 102 or 104 each may be a device of the same or a different type from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or health-care) based on 5G communication technology or IoT-related technology.

Figure 1B:
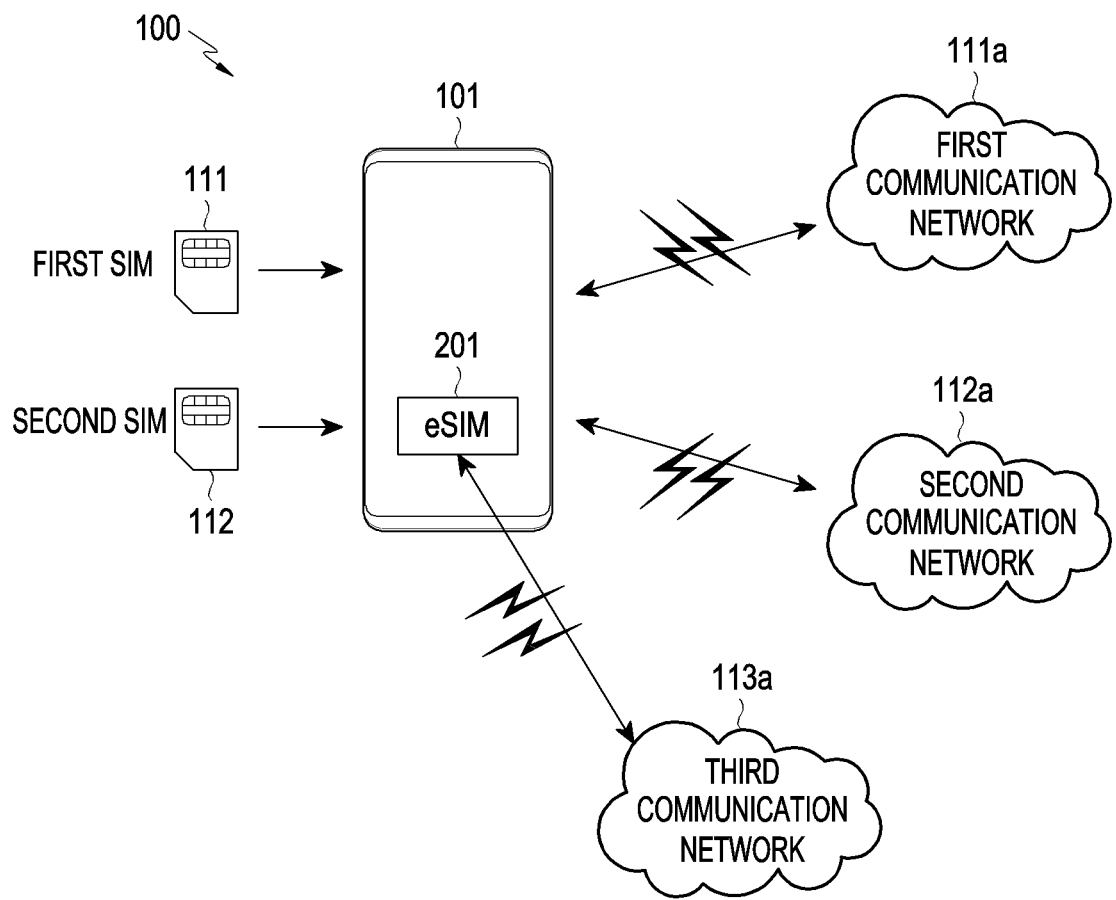
FIG. 1B is a view illustrating a network environment including an electronic device according to an embodiment of the disclosure.

FIG. 1B is a view illustrating a network environment 100 including an electronic device according to an embodiment of the disclosure.

Referring to FIG. 1B, according to various embodiments of the disclosure, a network environment 100 may include an electronic device 101, a first communication network 111a, a second communication network 112a, or a third communication network 113a.

According to various embodiments of the disclosure, the electronic device 101 may operate as a dual SIM dual standby (DSDS) mode or dual SIM dual active (DSDA) mode electronic device supporting a plurality of SIMs in one device. For example, the electronic device 101 may be equipped with two SIMs, e.g., a first SIM 111 and a second SIM 112. The first SIM 111 and the second SIM 112 may be removable SIMs (rSIMs). The rSIM may be a SIM detachable from a slot provided in the electronic device 101 and its form/specifications are not limited to specific ones. For example, the electronic device 101 may be equipped with two SIM cards to support the two SIMs. Hereinafter, for convenience of description, the SIM card will be referred to as a SIM. As illustrated in FIG. 1B, two SIM cards, the first SIM 111 and the second SIM 112, may be mounted in the electronic device 101. The electronic device 101 may include a first slot (not shown) and a second slot (not shown), which are first structures, to receive the first SIM 111 and the second SIM 112, respectively.

According to various embodiments of the disclosure, the first SIM 111 is a SIM which has subscription to the mobile network operator of the first communication network 111a. The electronic device 101 may access the first communication network 111a using the first SIM 111 to receive the wireless communication service. The second SIM 112 is a SIM which has subscription to the mobile network operator of the second communication network 112a. The electronic device 101 may access the second communication network 112a using the second SIM 112 to receive the wireless communication service. According to various embodiments of the disclosure, the electronic device 101 may include an embedded subscriber identity module (eSIM) 201. The eSIM may be referred to as an eUICC. The electronic device 101 may receive a wireless communication service by accessing the third communication network 113a using the eSIM 201. At least some of the first communication network 111a, the second communication network 112a, or the third communication network 113a may be provided by the same mobile network operator or by different mobile network operators.

Figure 2A:
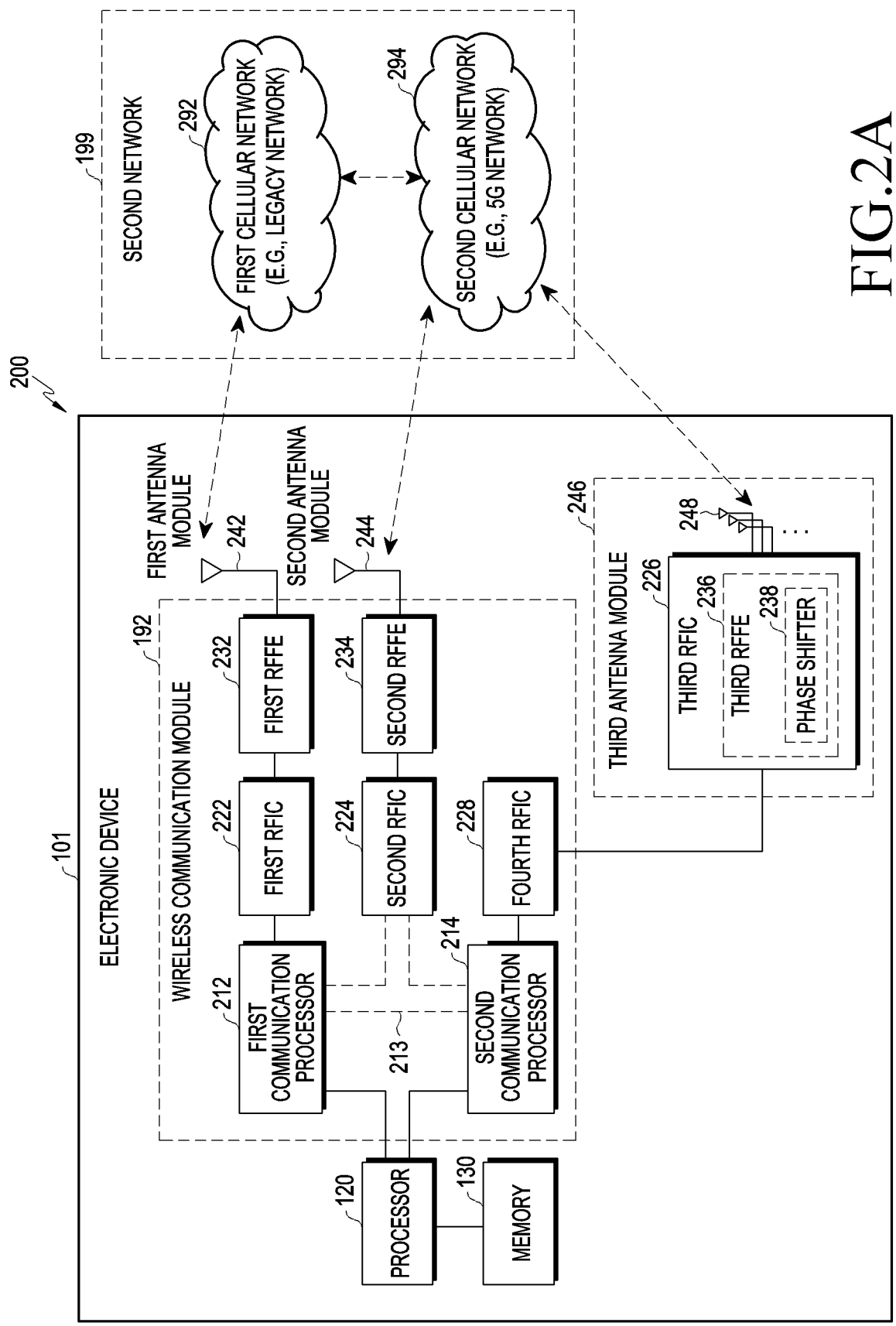
FIG. 2A is a block diagram illustrating an electronic device for supporting legacy network communication and $5^{th}$ generation (5G) network communication according to an embodiment of the disclosure.

FIG. 2A is a block diagram 200 illustrating an electronic device 101 for supporting legacy network communication and 5G network communication according to an embodiment of the disclosure.

Referring to FIG. 2A, the electronic device 101 may include a first communication processor 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, a third antenna module 246, and antennas 248. The electronic device 101 may further include a processor 120 and a memory 130. The second network 199 may include a first cellular network 292 and a second cellular network 294. According to another embodiment of the disclosure, the electronic device 101 may further include at least one component among the components of FIGS. 1A and 1B, and the second network 199 may further include at least one other network. According to an embodiment of the disclosure, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment of the disclosure, the fourth RFIC 228 may be omitted or be included as part of the third RFIC 226.

The first communication processor 212 may establish a communication channel of a band that is to be used for wireless communication with the first cellular network 292 or may support legacy network communication via the established communication channel. According to various embodiments of the disclosure, the first cellular network may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second cellular network 294 or may support fifth generation (5G) network communication via the established communication channel According to various embodiments of the disclosure, the second cellular network 294 may be a 5G network defined by the 3rd generation partnership project (3GPP). Additionally, according to an embodiment of the disclosure, the first CP 212 or the second CP 214 may establish a communication channel corresponding to another designated band (e.g., about 6 GHz or less) among the bands that are to be used for wireless communication with the second cellular network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214. For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

According to an embodiment of the disclosure, the first communication processor 212 and the second communication processor 214 may be implemented in a single chip or a single package. According to various embodiments of the disclosure, the first communication processor 212 or the second communication processor 214, along with the processor 120, an assistance processor 123, or communication module 190, may be formed in a single chip or single package.

Figure 2B:
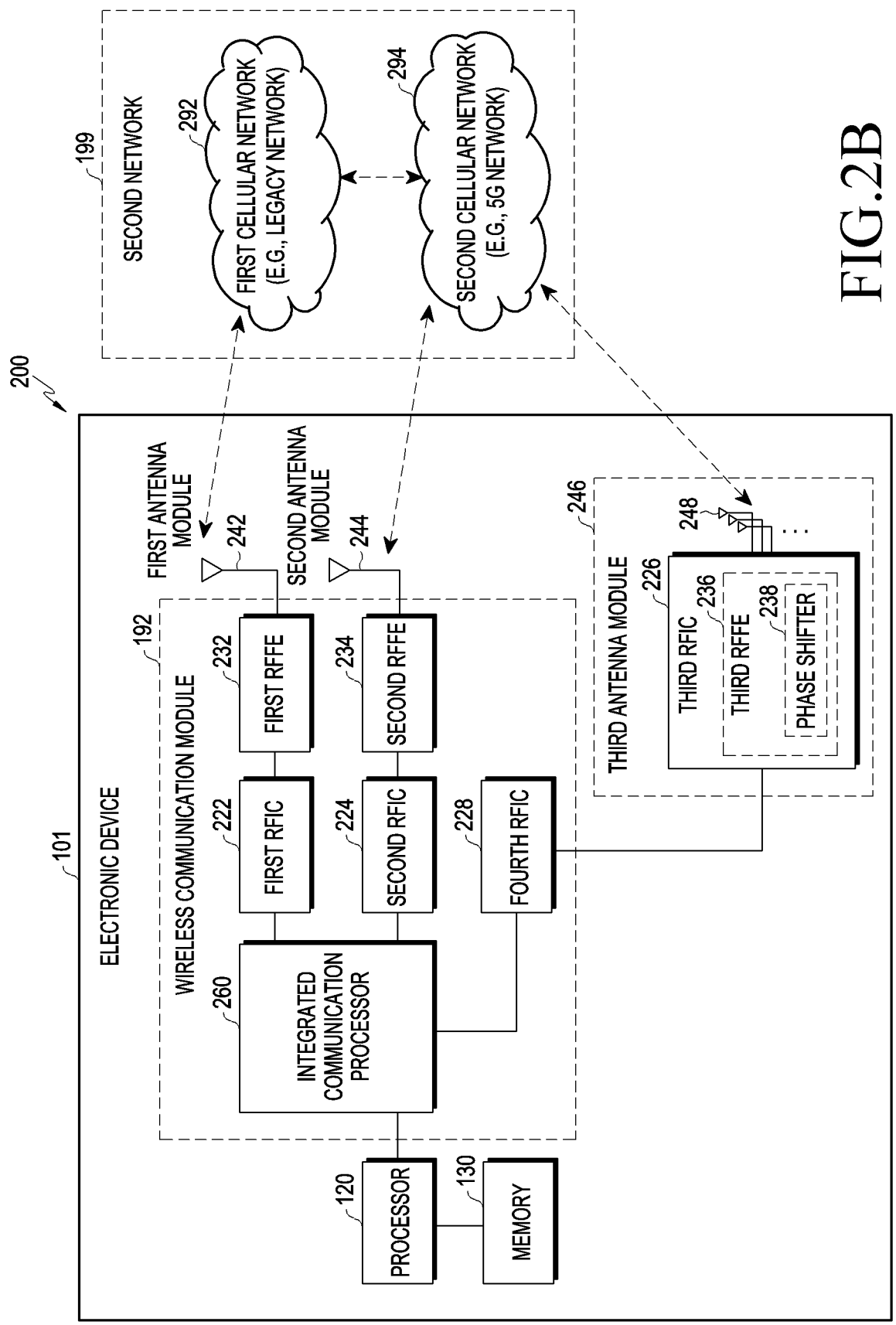
FIG. 2B is a block diagram illustrating an electronic device for supporting legacy network communication and 5G network communication according to an embodiment of the disclosure.

FIG. 2B is a block diagram illustrating an electronic device for supporting legacy network communication and 5G network communication according to an embodiment of the disclosure.

Referring to FIG. 2B, an integrated communication processor 260 may support all of the functions for communication with the first cellular network 292 and the second cellular network 294.

Upon transmission, the first RFIC 222 may convert a baseband signal generated by the first communication processor 212 into a radio frequency (RF) signal with a frequency ranging from about 700 MHz to about 3 GHz which is used by the first cellular network 292 (e.g., a legacy network). Upon receipt, the RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first communication processor 212 or the second communication processor 214 into a Sub6-band (e.g., about 6 GHz or less) RF signal (hereinafter, "5G Sub6 RF signal") that is used by the second cellular network 294 (e.g., a 5G network). Upon receipt, the 5G Sub6 RF signal may be obtained from the second cellular network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., about 6 GHz to about 60 GHz) RF signal (hereinafter, "5G Above6 RF signal") that is to be used by the second cellular network 294 (e.g., a 5G network). Upon receipt, the 5G Above6 RF signal may be obtained from the second cellular network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment of the disclosure, the third RFFE 236 may be formed as part of the third RFIC 226.

According to an embodiment of the disclosure, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, "IF signal") and transfer the IF signal to the third RFIC 226. The third RFIC 226 may convert the IF signal into a 5G Above6 RF signal. Upon receipt, the 5G Above6 RF signal may be received from the second cellular network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment of the disclosure, the first RFIC 222 and the second RFIC 224 may be implemented as at least part of a single chip or single package. According to various embodiments of the disclosure, when the first RFIC 222 and the second RFIC 224 in FIG. 2A or 2B are implemented as a single chip or a single package, they may be implemented as an integrated RFIC. In this case, the integrated RFIC may be connected to the first RFFE 232 and the second RFFE 234, and the integrated RFIC may convert a baseband signal into a signal of a band supported by the first RFFE 232 and/or the second RFFE 234 and may transmit the converted signal to one of the first RFFE 232 and the second RFFE 234. According to an embodiment of the disclosure, the first RFFE 232 and the second RFFE 234 may be implemented as at least part of a single chip or single package. According to an embodiment of the disclosure, at least one of the first antenna module 242 or the second antenna module 244 may be omitted or be combined with another antenna module to process multi-band RF signals.

According to an embodiment of the disclosure, the third RFIC 226 and the antenna 248 may be disposed on the same substrate to form the third antenna module 246. For example, the wireless communication module 192 or the processor 120 may be disposed on a first substrate (e.g., a main painted circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to an embodiment of the disclosure, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This enables transmission or reception via beamforming between the electronic device 101 and the outside.

The second cellular network 294 (e.g., a 5G network) may be operated independently (e.g., as standalone (SA)) from, or in connection (e.g., as non-standalone (NSA)) with the first cellular network 292 (e.g., a legacy network). For example, the 5G network may include access networks (e.g., 5G access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 230 and be accessed by other components (e.g., the processor 120, the first communication processor 212, or the second communication processor 214).

Figure 3A:
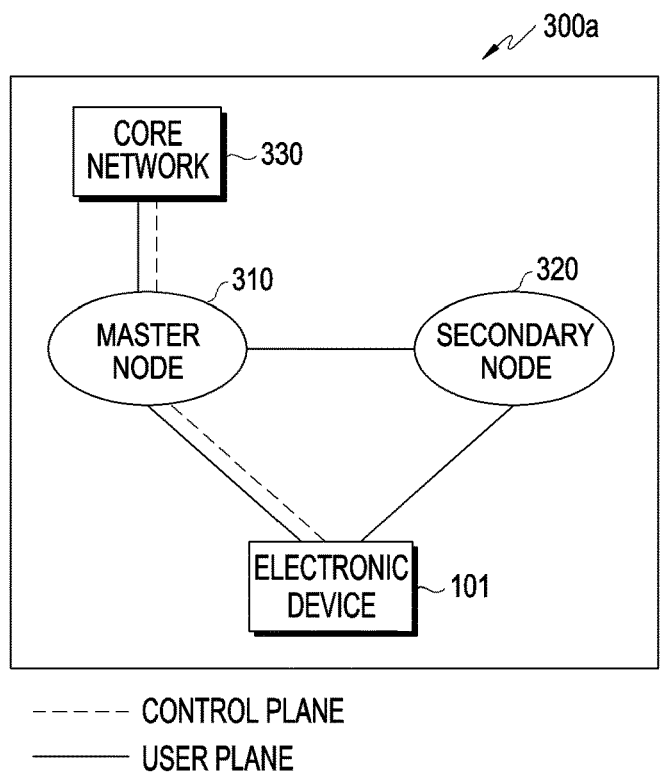
FIG. 3A is a view illustrating a wireless communication system that provides a legacy communication and/or 5G communication network according to an embodiment of the disclosure.
Figure 3B:
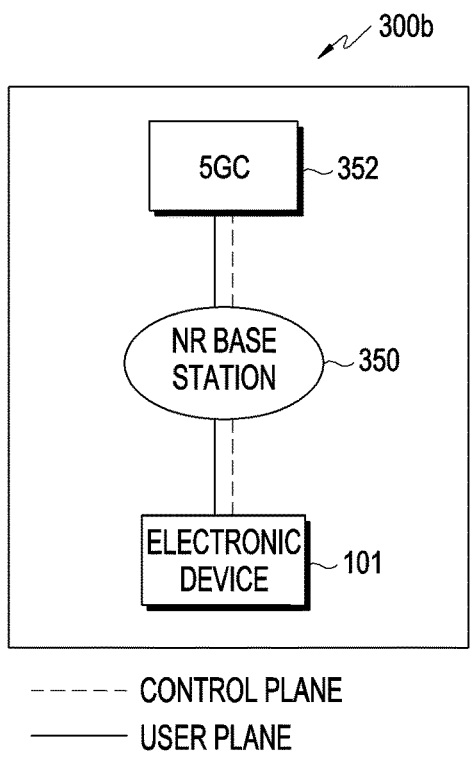
FIG. 3B is a view illustrating a wireless communication system that provides a legacy communication and/or 5G communication network according to an embodiment of the disclosure.
Figure 3C:
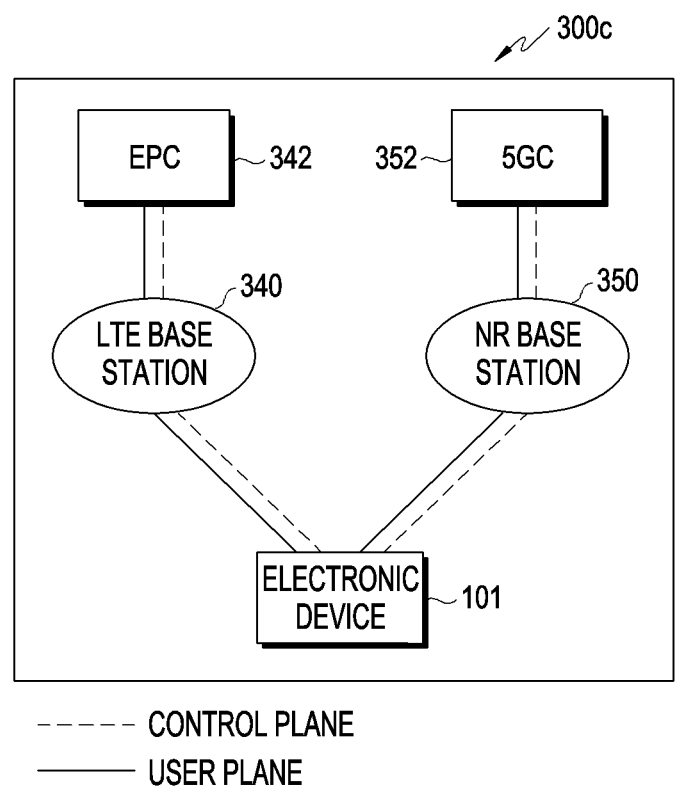
FIG. 3C is a view illustrating a wireless communication system that provides a legacy communication and/or 5G communication network according to an embodiment of the disclosure.

FIGS. 3A, 3B, and 3C are views illustrating wireless communication systems providing legacy communication and/or 5G communication networks according to various embodiments of the disclosure.

Referring to FIGS. 3A, 3B, and 3C, the network environment 301a to 300c may include at least one of a legacy network and a 5G network. The legacy network may include, e.g., a 3GPP-standard 4G or LTE base station 340 (e.g., an eNodeB (eNB)) that supports radio access with the electronic device 101 and an evolved packet core (EPC) 342 that manages 4G communication. The 5G network may include, e.g., an NR base station 350 (e.g., a gNodeB (gNB)) that supports radio access with the electronic device 101 and a fifth generation core (5GC) 352 that manages 5G communication for the electronic device 101.

According to various embodiments of the disclosure, the electronic device 101 may transmit or receive control messages and user data via legacy communication and/or 5G communication. The control messages may include, e.g., messages related to at least one of security control, bearer setup, authentication, registration, or mobility management for the electronic device 101. The user data may mean, e.g., user data except for control messages transmitted or received between the electronic device 101 and the core network 330 (e.g., the EPC 342).

Referring to FIG. 3A, according to an embodiment of the disclosure, the electronic device 101 may transmit or receive at least one of a control message or user data to/from at least part (e.g., the NR base station 350 or 5GC 352) of the 5G network via at least part (e.g., the LTE base station 340 or EPC 342) of the legacy network.

According to various embodiments of the disclosure, the network environment 300a may include a network environment that provides wireless communication dual connectivity (DC) to the LTE base station 340 and the NR base station 350 and transmits or receives control messages to/from the electronic device 101 via one core network 230 of the EPC 342 or the 5GC 352.

According to various embodiments of the disclosure, in the DC environment, one of the LTE base station 340 or the NR base station 350 may operate as a master node (MN) 310, and the other as a secondary node (SN) 320. The MN 310 may be connected with the core network 230 to transmit or receive control messages. The MN 310 and the SN 320 may be connected with each other via a network interface to transmit or receive messages related to radio resource (e.g., communication channel) management therebetween.

According to various embodiments of the disclosure, the MN 310 may include the LTE base station 340, the SN 320 may include the NR base station 350, and the core network 330 may include the EPC 342. For example, control messages may be transmitted/received via the LTE base station 340 and the EPC 342, and user data may be transmitted/received via at least one of the LTE base station 340 or the NR base station 350.

According to various embodiments of the disclosure, the MN 310 may include the NR base station 350, and the SN 320 may include the LTE base station 340, and the core network 330 may include the 5GC 352. For example, control messages may be transmitted/received via the NR base station 350 and the 5GC 352, and user data may be transmitted/received via at least one of the LTE base station 340 or the NR base station 350.

Referring to FIG. 3B, according to an embodiment of the disclosure, the 5G network may include the NR base station 350 and the 5GC 352 and transmit or receive control messages and user data independently from the electronic device 101.

Referring to FIG. 3C, according to an embodiment of the disclosure, the legacy network and the 5G network each may provide data transmission/reception independently. For example, the electronic device 101 and the EPC 342 may transmit or receive control messages and user data via the LTE base station 340. As another example, the electronic device 101 and the 5GC 352 may transmit or receive control messages and user data via the NR base station 350.

According to various embodiments of the disclosure, the electronic device 101 may be registered in at least one of the EPC 342 or the 5GC 352 to transmit or receive control messages.

According to various embodiments of the disclosure, the EPC 342 or the 5GC 352 may interwork with each other to manage communication for the electronic device 101. For example, mobility information for the electronic device 101 may be transmitted or received via the interface between the EPC 342 and the 5GC 352.

As set forth above, dual connectivity via the LTE base station 340 and the NR base station 350 may be referred to as E-UTRA new radio dual connectivity (EN-DC).

Figure 4:
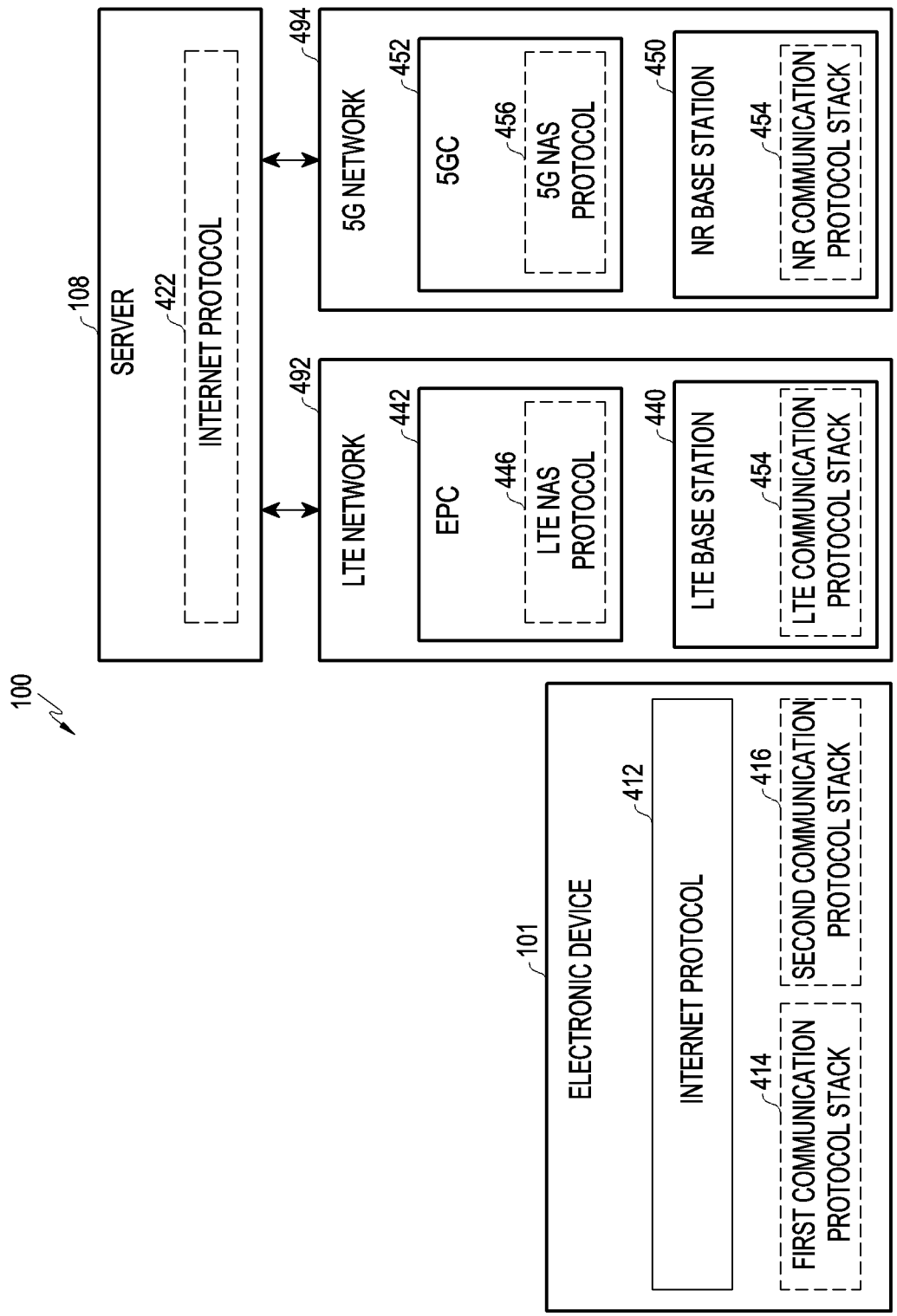
FIG. 4 is a view illustrating a protocol stack structure of a communication network according to an embodiment of the disclosure.

FIG. 4 is a view illustrating a protocol stack structure of an LTE communication and/or 5G communication network environment 100 according to an embodiment of the disclosure.

Referring to FIG. 4, the network environment 100 according to the illustrated embodiment may include an electronic device 101, an LTE network 492, a 5G network 494, and a server 108.

The electronic device 101 may include an Internet protocol 412, a first communication protocol stack 414, and a second communication protocol stack 416. The electronic device 101 may communicate with a server 108 through the LTE network 492 and/or the 5G network 494. According to an embodiment of the disclosure, the electronic device 101 may perform Internet communication associated with the server 108 using the Internet protocol 412 (e.g., TCP, UDP, IP). The Internet protocol 412 may be executed by, e.g., a main processor (e.g., the main processor 121 of FIGS. 1A and 1B) included in the electronic device 101.

According to another embodiment of the disclosure, the electronic device 101 may wirelessly communicate with the LTE network 492 using the first communication protocol stack 414. According to another embodiment of the disclosure, the electronic device 101 may wirelessly communicate with the 5G network 494 using the second communication protocol stack 416. The first communication protocol stack 414 and the second communication protocol stack 416 may be executed by, e.g., one or more communication processors (e.g., the wireless communication module 192 of FIGS. 1A and 1B) included in the electronic device 101.

The server 108 may include an Internet protocol 422. The server 108 may transmit/receive data related to the Internet protocol 422 to/from the electronic device 101 through the LTE network 492 and/or the 5G network 494. According to an embodiment of the disclosure, the server 108 may include a cloud computing server that exists outside the LTE network 492 or 5G network 494. In another embodiment of the disclosure, the server 108 may include an edge computing server (or a mobile edge computing (MEC) server) located inside at least one of the LTE network 492 or the 5G network 494.

The LTE network 492 may include an LTE base station 440 and an EPC 442. The LTE base station 440 may include an LTE communication protocol stack 444. The EPC 442 may include a legacy NAS protocol 446. The LTE network 492 may perform LTE wireless communication with the electronic device 101 using the LTE communication protocol stack 444 and the LTE NAS protocol 446. The 5G network 494 may include an NR base station 450 and a 5GC 452. The NR base station 450 may include an NR communication protocol stack 454. The 5GC 452 may include a 5G NAS protocol 456. The 5G network 494 may perform NR wireless communication with the electronic device 101 using the NR communication protocol stack 454 and the 5G NAS protocol 456.

According to an embodiment of the disclosure, the first communication protocol stack 414, the second communication protocol stack 416, the LTE communication protocol stack 444, and the NR communication protocol stack 454 may include a control plane protocol for transmitting and receiving control messages and a user plane protocol for transmitting and receiving user data. The control messages may include, e.g., messages related to at least one of security control, bearer setup, authentication, registration, or mobility management. The user data may include data other than control messages, for example.

According to an embodiment of the disclosure, the control plane protocol and the user plane protocol may include physical (PHY), medium access control (MAC), radio link control (RLC), or packet data convergence protocol (PDCP) layers. The PHY layer may, e.g., channel-code and modulate the data received from a higher layer (e.g., the MAC layer) and transmit it via a radio channel and may demodulate and decode the data received via a radio channel and deliver it to the higher layer. The PHY layer included in the second communication protocol stack 416 and the NR communication protocol stack 454 may further perform an operation related to beamforming The MAC layer may logically/physically map to a radio channel to transmit/receive data and perform a hybrid automatic repeat request (HARQ) for error correction. The RLC layer may perform concatenation, segmentation, or reassembly of data, and may identify the order of data, rearrange data, or redundancy-check data, for example. The PDCP layer may perform operations related to, e.g., ciphering and data integrity of control messages and user data. The second communication protocol stack 416 and the NR communication protocol stack 454 may further include a service data adaptation protocol (SDAP). The SDAP may manage the allocation of radio bearers based on the quality-of-service (QoS) of user data.

According to various embodiments of the disclosure, the control plane protocol may include a radio resource control (RRC) layer and a non-access stratum (NAS) layer. The RRC layer may process control data related to radio bearer setup, paging, or mobility management, for example. The NAS may handle control messages related to, e.g., authentication, registration, and mobility management.

Figure 5:
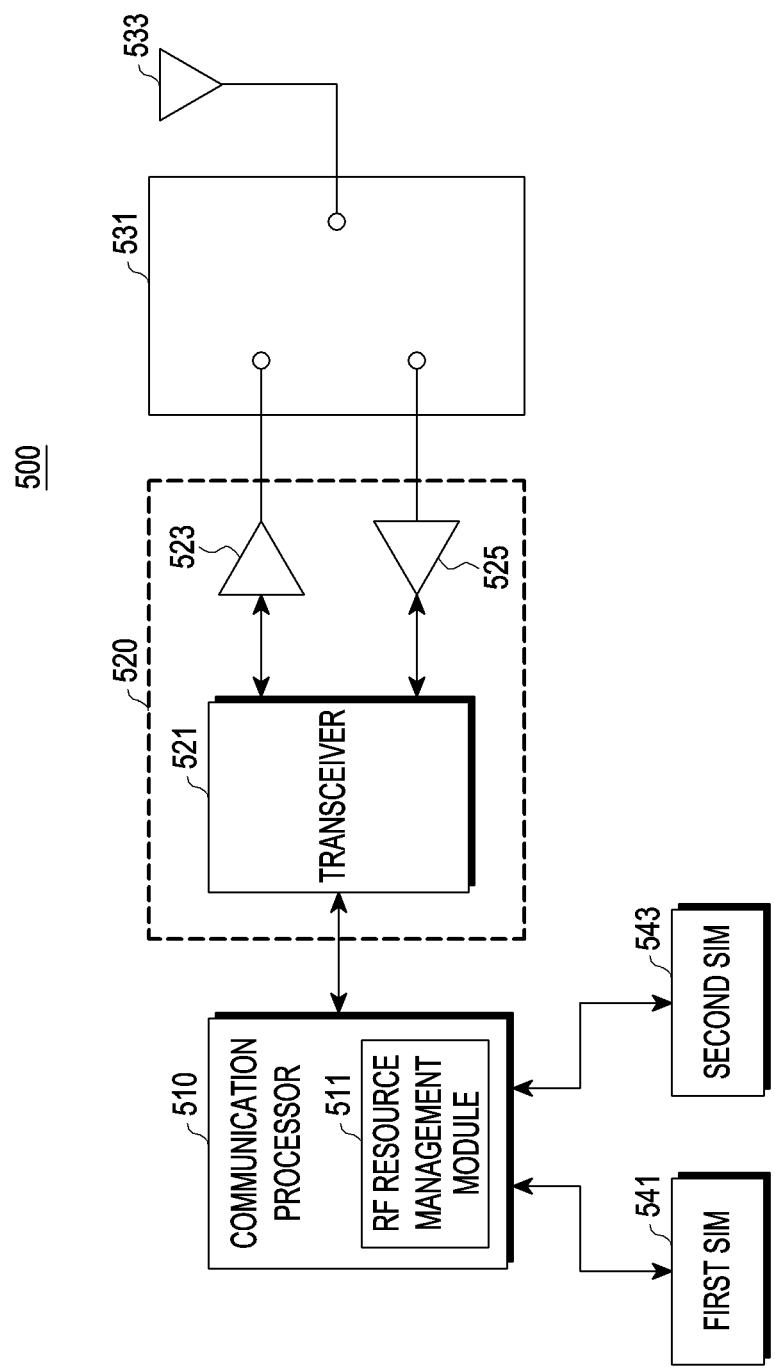
FIG. 5 is a block diagram illustrating an electronic device according to an embodiment of the disclosure.

FIG. 5 is a block diagram illustrating an electronic device according to an embodiment of the disclosure.

Referring to FIG. 5, according to various embodiments of the disclosure, an electronic device (e.g., the electronic device 101 of FIGS. 1A and 1B) 500 may include a communication processor 510 (e.g., the first communication processor 212, the second communication processor 214, integrated communication processor 260), a wireless communication circuit 520, a switch 531, an antenna 533, a first subscriber identity module (SIM) 541 and/or a second subscriber identity module 543.

According to various embodiments of the disclosure, the communication processor 510 may perform various operations for wireless communication on a cellular network. For example, the communication processor 510 may establish a communication channel of a band that is to be used for wireless communication with the cellular network or may support wireless communication via the established communication channel According to various embodiments of the disclosure, the communication processor 510 may include an RF resource management module 511. The RF resource management module 511 may control the first SIM 541 or the second SIM 543 to selectively use an RF resource (not shown) of the wireless communication circuit 520. For example, if the electronic device 500 supports DSDS, the RF resource management module 511 may control any one of the first SIM 541 or the second SIM 543 to use an RF resource (not shown) of the wireless communication circuit 520 at one time. According to various embodiments of the disclosure, the RF resource management module 511 may control any one of the first SIM 541 or the second SIM 543 to use the RF resource (not shown) of the wireless communication circuit 520 at a specific time according to priority or a set algorithm, and the embodiments described below are not limited to a specific algorithm or a specific priority.

According to various embodiments of the disclosure, the wireless communication circuit 520 may receive signals radiated from the outside through the antenna 533 or radiate the signal, transmitted by the communication processor 510, through the antenna 533 based on control of the communication processor 510. The wireless communication circuit 520 may include a transceiver 521 and RF resources (not shown) for processing signals. The RF resources may include an amplifier 523, which amplifies the signal transmitted by the transceiver 521 and transmits the amplified signal to the antenna 533, and a low-noise amplifier (LNA) 525, which amplifies the signal received through the antenna 533 and transmits the amplified signal to the transceiver 521.

According to various embodiments of the disclosure, the transceiver 521 may perform various operations to process the signal received from the communication processor 510. For example, the transceiver 521 may perform a modulation operation on the signal received from the communication processor 521. For example, the transceiver 521 may perform a frequency modulation operation for converting a baseband signal into a radio frequency (RF) signal used for cellular communication. The transceiver 521 may perform a demodulation operation on the signal received from the outside through the antenna 533. For example, the transceiver 521 may perform a frequency demodulation operation for converting a radio frequency (RF) signal into a baseband signal.

According to various embodiments of the disclosure, the switch 531 may connect one of a resource (e.g., the amplifier 523) related to signal transmission among the RF resources and a resource related (e.g., the low-noise amplifier 525) related to signal reception with the antenna 533 based on control of the communication processor 510.

According to various embodiments of the disclosure, the subscriber identity modules (SIMs) 541 and 543 may store identification information (e.g., IMSI) for access, authentication, billing, and security in a cellular network. The electronic device 500 may identify identification information stored in the first SIM 541 and/or the second SIM 543 and transmit the identification information to the base station in a cellular network access procedure (e.g., a registration procedure). According to various embodiments of the disclosure, the SIMs 512 and 514 may be formed of IC cards and be mounted in the slots provided in the electronic device 500. According to another embodiment of the disclosure, at least one of the SIMs 541 and 543 may be implemented as an embedded-SIM (or embedded universal integrated circuit card (eUICC)) directly embedded in the electronic device 500. When the SIMs 541 and 543 are implemented as embedded-SIMs, after a security chip for storing the SIMs 541 and 543 is mounted on the circuit board of the electronic device 500 in the manufacturing process, they may be mounted on the electronic device through remote SIM provisioning.

According to various embodiments of the disclosure, the electronic device 500 may include at least two SIMs. In the disclosure, an embodiment in which the electronic device 500 includes two SIMs (e.g., the first SIM 541 and the second SIM 543) is described, but embodiments of the disclosure are not limited thereto.

According to various embodiments of the disclosure, the electronic device 500 may perform wireless communication a first communication network and a second communication network operated by different operators (or mobile communication carriers) using the first SIM 541 and the second SIM 543. For example, upon accessing the first communication network, the communication processor 510 may wirelessly access the base station of the first communication network using first identification information stored in the first SIM 512 and, upon accessing the second communication network, the communication processor 510 may wirelessly access the base station of the second communication network according to second identification information stored in the second SIM 514.

According to various embodiments of the disclosure, the first communication network and/or the second communication network may be one of various mobile communication networks. According to an embodiment of the disclosure, the first communication network and the second communication network may be either a 4G mobile communication network (LTE) or a 5G cellular communication network (new radio, NR). According to another embodiment of the disclosure, the first communication network may be a network supporting EUTRA-NR-Dual-Connectivity (EN-DC). The EUTRA NR Dual Connectivity (EN-DC) or non-standalone (NSA) system may provide uplink and/or downlink transmission using two radio access technologies (RATs). An electronic device 500 connected to the first communication network supporting EN-DC may simultaneously use the resources of the 4G LTE network and the 5G NR network.

According to various embodiments of the disclosure, the communication processor 510 may simultaneously access and wait for the first communication network and the second communication network using the first SIM 541 and the second SIM 514. The communication processor 510 may perform data communication through one of the first communication network or the second communication network for data transmission or reception. In this case, the communication processor 510 may perform data communication through one communication network and may not perform data communication through the other communication network (or may wait for data reception through the other communication network). The communication network, which is not used in performing data communication, and the electronic device may be connected every preset period for transmitting or receiving a paging message.

For example, when performing data communication through the first communication network, the RF resource management module 511 of the communication processor 510 may allocate the RF resource (e.g., the transceiver 521, the amplifier 523 and/or the low-noise amplifier 525) included in the wireless communication circuit 520 to the first SIM 541 (or the first communication network). The RF resource management module 511 of the communication processor 510 may perform data communication through the RF resource allocated to the first SIM 541. In this case, since the RF resource stays not allocated to the second SIM 543, the communication processor 510 may be in a state of being capable of data communication through the second communication network. The RF resource management module 511 of the communication processor 510 may allocate an RF resource to the second SIM 543 every designated period. The communication processor 510 may receive the data (e.g., a paging message) transmitted from the second communication network while the RF resource stays allocated to the second SIM 543. The RF resource management module 511 of the communication processor 510 may re-allocate an RF resource to the first SIM 541 in response to expiration of a designated period and may perform data communication through the first communication network.

As another example, when performing data communication through the second communication network, the RF resource management module 511 of the communication processor 510 may allocate the RF resource (e.g., the transceiver 521, the amplifier 523 and/or the low-noise amplifier 525) included in the wireless communication circuit 520 to the second SIM 543 (or the second communication network). The RF resource management module 511 of the communication processor 510 may perform data communication through the RF resource allocated to the second SIM 543. In this case, since the RF resource stays not allocated to the first SIM 541, the communication processor 510 may be in a state of being capable of data communication through the first communication network. The communication processor 510 may allocate an RF resource to the first SIM 541 every designated period. The communication processor 510 may receive the data (e.g., a paging message) transmitted from the first communication network while the RF resource stays allocated to the first SIM 541. The communication processor 510 may re-allocate an RF resource to the second SIM 543 in response to expiration of a designated period and may perform data communication through the second communication network.

According to various embodiments of the disclosure, in the electronic device 500, the SIM to be used for data communication may be changed. For example, the communication processor 510 may detect an operation of triggering data communication through the first communication network while data communication is being performed using the second SIM 543. For example, while the electronic device 500 is performing Internet data communication with the second communication network, the electronic device 500 may detect a user input requesting connection with the first communication network or execution of an application performing cellular communication provided by the first communication network.

According to various embodiments of the disclosure, the RF resource management module 511 of the communication processor 510 may allocate an RF resource the first SIM (or the first communication network) in response to detecting activation of data transmission through the first communication network while staying connected with the second communication network. The communication processor 510 may perform a connection procedure with a first base station of the first communication network (e.g., if the first communication network supports EN-DC, a base station supporting 4G mobile communication or a base station supporting the NSA mode of 5G mobile communication) through the RF resource.

According to various embodiments of the disclosure, after connecting with the first base station, the communication processor 510 may perform a connection procedure with the second base station. When the second base station is a base station supporting dual-connectivity (e.g., a base station supporting NR in EN-DC), the communication processor 510 may perform an operation for connecting with both the first base station and the second base station. When the first base station is a base station supporting non-standalone (NSA) and the second base station is a base station supporting standalone (SA), the communication processor 510 may release the connection with the first base station after completing the connection with the second base station.

According to various embodiments of the disclosure, the communication processor 510 may allocate an RF resources to the second SIM 543 to ensure reception of a message (e.g., a paging message) transmitted by the second communication network, after a first time (e.g., Sub-2 allocation time) The communication processor 510 may identify whether the first time expires through a timer (e.g., a Sub-2 allocation timer) that identifies whether the first time expires and may allocate an RF resource to the second SIM 543 in response to identifying that the first time expires. The first time may be a preset time.

According to various embodiments of the disclosure, the communication processor 510 may receive RRC configuration information from the first base station as part of the operation for connecting to the first communication network. The RRC configuration information may information for a condition for transmitting a result of measurement of the quality of a signal transmitted by the second base station to the second base station (e.g., a base station supporting 5G mobile communication or a base station supporting the SA mode of 5G mobile communication if the first cellular network supports EN-DC). For example, the information for the condition for transmitting the result of measurement of the quality of the signal transmitted by the second base station may be information related to a quality measurement request event (B1 event) of a signal (e.g., a reference signal) transmitted by the second base station and may include a designated value (B1 threshold) related to the quality of the signal transmitted by the second base station and/or a second time to trigger (TTT), which is a holding time of the signal transmitted by the second base station.

According to various embodiments of the disclosure, the communication processor 510 may measure the quality of the signal transmitted by the second base station as part of the operation for connecting to the first communication network while staying connected with the first base station. The communication processor 510 may perform connection with the second base station while staying connected with the first base station or release the connection with the first base station in such a manner as to transmit a measurement result to the first base station in response to the quality of the signal transmitted by the second base station being a designated value (B1 threshold) or more during a designated time TTT. According to an embodiment of the disclosure, the communication processor 510 may transmit the result of measurement of the quality of the signal transmitted by the second base station to the first base station in response to the signal transmitted by the second base station having the designated value (B1 threshold) during the designated time TTT. The communication processor 510 may perform connection to the second base station in response to reception of the handover request signal transmitted from the first base station or a connection request signal of the second base station.

If the first time expires while the communication processor 510 performs a series of operations for performing connection with the second base station, the RF resource may be allocated from the first SIM 541 to the second SIM 543. If the RF resource is allocated to the second SIM 543, the communication processor 510 may not perform the series of operations to perform connection with the second base station until the RF resource is allocated to the first SIM 541.

Figure 6:
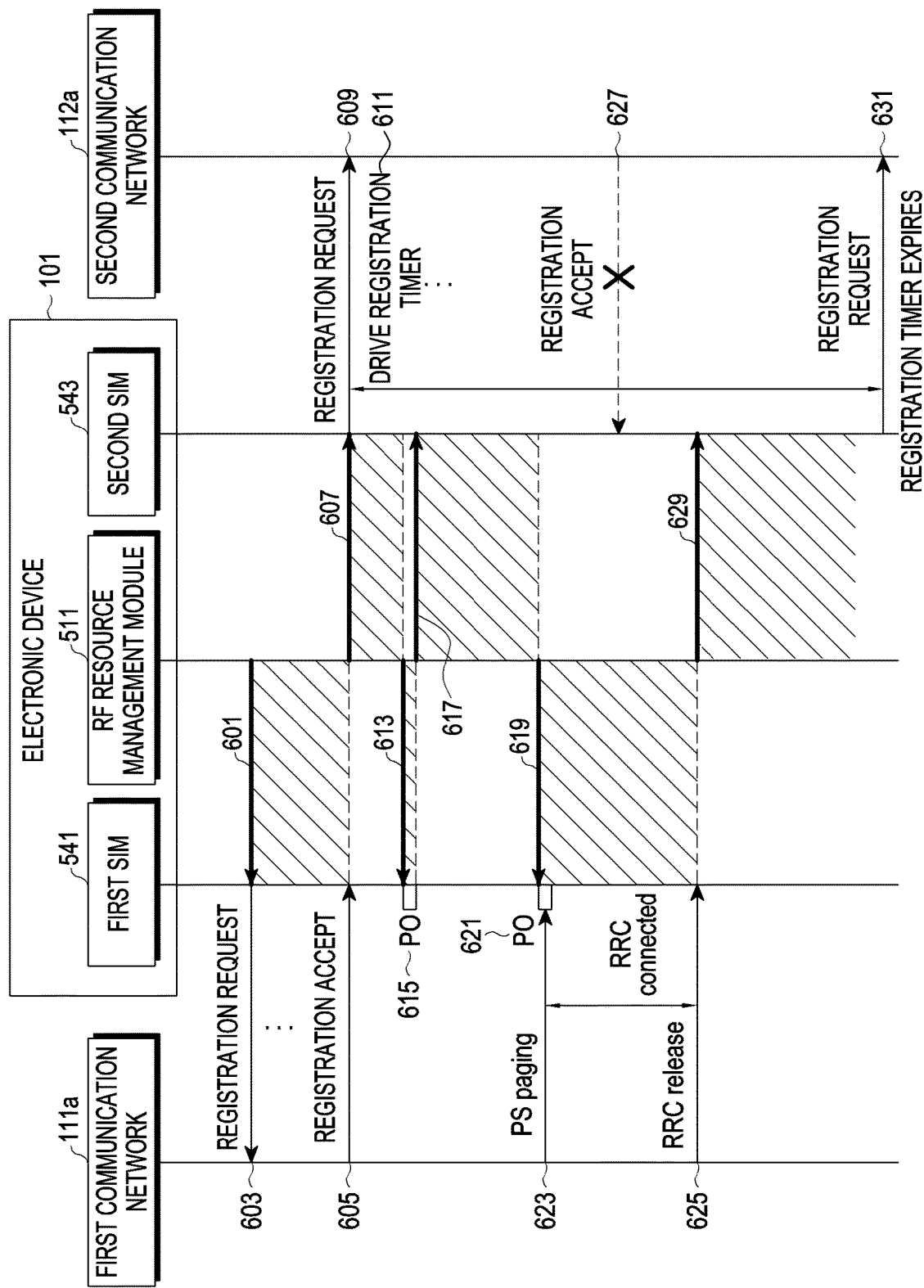
FIG. 6 is a flowchart illustrating operations for registering in a communication network by an electronic device according to an embodiment of the disclosure.

FIG. 6 is a flowchart illustrating operations for registering in a communication network by an electronic device according to an embodiment of the disclosure.

Referring to FIG. 6, the electronic device 101 may include a first SIM 541 and a second SIM 543. According to various embodiments of the disclosure, the electronic device 101 may support DSDS that allows any one of the first SIM 541 or the second SIM 543 to use an RF resource. For example, the RF resource management module 511 of the electronic device 101 may allocate the RF resource to the first SIM 541 or the second SIM 543 according to a set algorithm or a set priority. The RF resource management module 511 may be referred to as a transceiver resource management module (TRM module) or a SIM scheduler, but various embodiments are not limited to the term. The first SIM 541 may have subscription to the first communication 111*a* to register in the first communication network 111*a*, and the second SIM 543 may have subscription to the second communication network 111*b* to register in the second communication network 111*b*, but embodiments of the disclosure are not limited thereto. The first communication network 111*a* may include at least one communication network of 5G, LTE, WCDMA, or GSM. The second communication network 111*b* may include at least one communication network of 5G, LTE, WCDMA, or GSM.

The first SIM 541 or the second SIM 543 may be set as a data-only SIM or a non-data-only SIM. The data-only SIM may be referred to as a default data subscription (DDS) SIM, and the non-data-only SIM may be referred to as a non-DDS (nDDS) SIM, but various embodiments are not limited thereto. For example, if the first SIM 541 is set as a data-only SIM, the second SIM 543 may be configured as a non-data-only SIM. If the first SIM 541 is set as a non-data-only SIM, the second SIM 543 may be set as a data-only SIM. The data-only SIM or the non-data-only SIM may be implemented to be set by the user through a SIM setting menu. According to various embodiments of the disclosure, although it is assumed in FIG. 6 that the first SIM 541 is as a non-data-only SIM, and the second SIM 543 is set as a data-only SIM, embodiments are not limited thereto.

According to various embodiments of the disclosure, the RF resource management module 511 of the electronic device 101 may perform control to perform a registration procedure for the first SIM 541, set as a non-data-only SIM, preferentially over a registration procedure for the second SIM, according to the setting. Referring to FIG. 6, the RF resource management module 511 of the electronic device 101 may allocate the use of an RF circuit (or RF resource) to the first SIM 541 in operation 601. If the use of the RF circuit is allocated to the first SIM 541 as the electronic device 101 supports DSDS, the second SIM 543 may be set not to use the RF circuit.

According to various embodiments of the disclosure, if the use of the RF circuit is allocated to the first SIM 541 of the electronic device 101, the electronic device 101 may transmit a registration request to the first communication network 111*a* in operation 603, thereby performing a procedure of registration in the first communication network 111*a* corresponding to the first SIM 541. For example, assuming that the first communication network 111*a* is a 5G network, the registration procedure may include at least one of operations between the registration request and the registration accept. As another example, assuming that the first communication network is an LTE network, at least one of the operations between the attach request and the attach accept may be included. According to various embodiments of the disclosure, the registration procedure may include at least one operation of a registration request, an RRC connection request, an RRC setup, an RRC connection complete, an authentication request, an authentication response, a security request, a security response, a UE capability enquiry, and UE capability information transmission.

According to various embodiments of the disclosure, in operation 605, the electronic device 101 may receive a registration accept from the first communication network 111*a* to complete the registration procedure. If the registration procedure of the first communication network 111*a* for the first SIM 541 is normally completed, the RF resource management module 511 of the electronic device 511 may allocate use of an RF circuit (or RF resource) to the second SIM 543 in operation 607. If the use of the RF circuit is allocated to the second SIM 543 as the electronic device 101 supports DSDS, the first SIM 541 may be set not to use the RF circuit.

According to various embodiments of the disclosure, if the use of the RF circuit is allocated to the second SIM 543 of the electronic device 101, the electronic device 101 may transmit a registration request to the second communication network 112*a* in operation 609, thereby performing a procedure of registration in the second communication network 112*a* corresponding to the second SIM 543. For example, assuming that the second communication network 112*a* is a 5G network, the registration procedure may include at least one of operations between the registration request and the registration accept. As another example, assuming that the first communication network is an LTE network, at least one of the operations between the attach request and the attach accept may be included. According to various embodiments of the disclosure, the registration procedure may include at least one operation of a registration request, an RRC connection request, an RRC setup, an RRC connection complete, an authentication request, an authentication response, a security request, a security response, a UE capability enquiry, and UE capability information transmission.

According to various embodiments of the disclosure, in response to a registration request to the second communication network 112*a*, the electronic device 101 (e.g., the non-access stratum (NAS) of the electronic device 101) may drive a registration-related timer (hereinafter, referred to as a 'registration timer' but not limited thereto) in operation 611. The registration timer may include, but is not limited to, a T3510 and/or a T3511 timer defined in 3GPP standard document TS 24.501 10.2. The registration timer may be a timer for retransmission of a registration request when registration is not normally performed after the registration request. For example, the electronic device 101 may drive the registration timer while transmitting a registration request to the second communication network 112a and, although registration fails before the timer expires, may retransmit a registration request after the timer expires.

According to various embodiments of the disclosure, the electronic device 101 may periodically (e.g., every paging period) allocate use of an RF circuit to the first SIM 541 to identify whether a paging signal is received for the first SIM 541 while performing a registration procedure for the second SIM 543. For example, the RF resource management module 511 of the electronic device 101 may allocate use of an RF circuit to the first SIM 541 every paging occasion 615 and 621 set for the first SIM 541 in operation 613 or 619 while the second SIM 543 performs the registration procedure. The electronic device 101 may receive a physical downlink control channel (PDCCH) set as a paging-radio network temporary identifier (P-RNTI) in a state in which the use of the RF circuit is allocated to the first SIM 541 and may receive a physical downlink shared channel (PDSCH) including a paging message including the identifier of the electronic device 101 based on the PDCCH. According to various embodiments of the disclosure, if there is no paging signal transmitted from the first communication network 111a to the electronic device 101 at the PO of 615, the RF resource management module 511 of the electronic device 101 may allocate the use of an RF circuit (or RF resource) to the second SIM 543 and continue the registration procedure of the second communication network 112a for the second SIM 543 in operation 617.

According to various embodiments of the disclosure, in operation 623, the first communication network 111a may transmit a paging signal (e.g., voice call paging or packet data paging) to the electronic device 101. The electronic device 101 may identify the paging signal transmitted from the first communication network 111a to the electronic device 101 at the PO of 621. As the paging signal is identified, the electronic device 101 may be switched to an RRC connected state to transmit/receive data to/from the first communication network 111a. For example, the electronic device 101 may receive multimedia message service (MMS) data or background app-related data transmitted from the outside in the RRC connected state. According to various embodiments of the disclosure, in the RRC connected state of the electronic device 101 with the first communication network 111a, the RF resource management module 511 may perform control so that use of the RF circuit allocated to the first SIM 541 is maintained. According to various embodiments of the disclosure, the registration procedure of the second SIM 543 may be stopped while the RRC connected state for the first SIM 541 is maintained. For example, in operation 627, the second SIM 543 does not receive the registration accept transmitted from the second communication network 112a and may thus fail in normal registration.

According to various embodiments of the disclosure, the electronic device 101 may receive an RRC release message from the first communication network 111a in operation 625. The RF resource management module 511 of the electronic device 101 may switch the use of the RF circuit allocated to the first SIM 541 to the second SIM 543 in response to receiving the RRC release message. For example, the RF resource management module 511 of the electronic device 101 may perform control so that the use of the RF circuit is allocated to the second SIM 543 in operation 629.

According to various embodiments of the disclosure, the RF resource management module 511 of the electronic device 101 performs control so that the use of the RF circuit is allocated to the second SIM 543 but may wait for retransmission of a registration request until the registration timer expires. For example, if the registration timer expires, the electronic device 101 may re-initiate the registration procedure by retransmitting a registration request to the second communication network 112a in operation 631.

According to various embodiments of the disclosure, although an RF circuit is allocated to the second SIM 543, registration of the second SIM 543 may be delayed as the registration timer is driven. In various embodiments to be described below, methods for preventing delay in registration of the second SIM 543 according to the operation of the first SIM 541 when the electronic device 101 supports DSDS are described.

Figure 7:
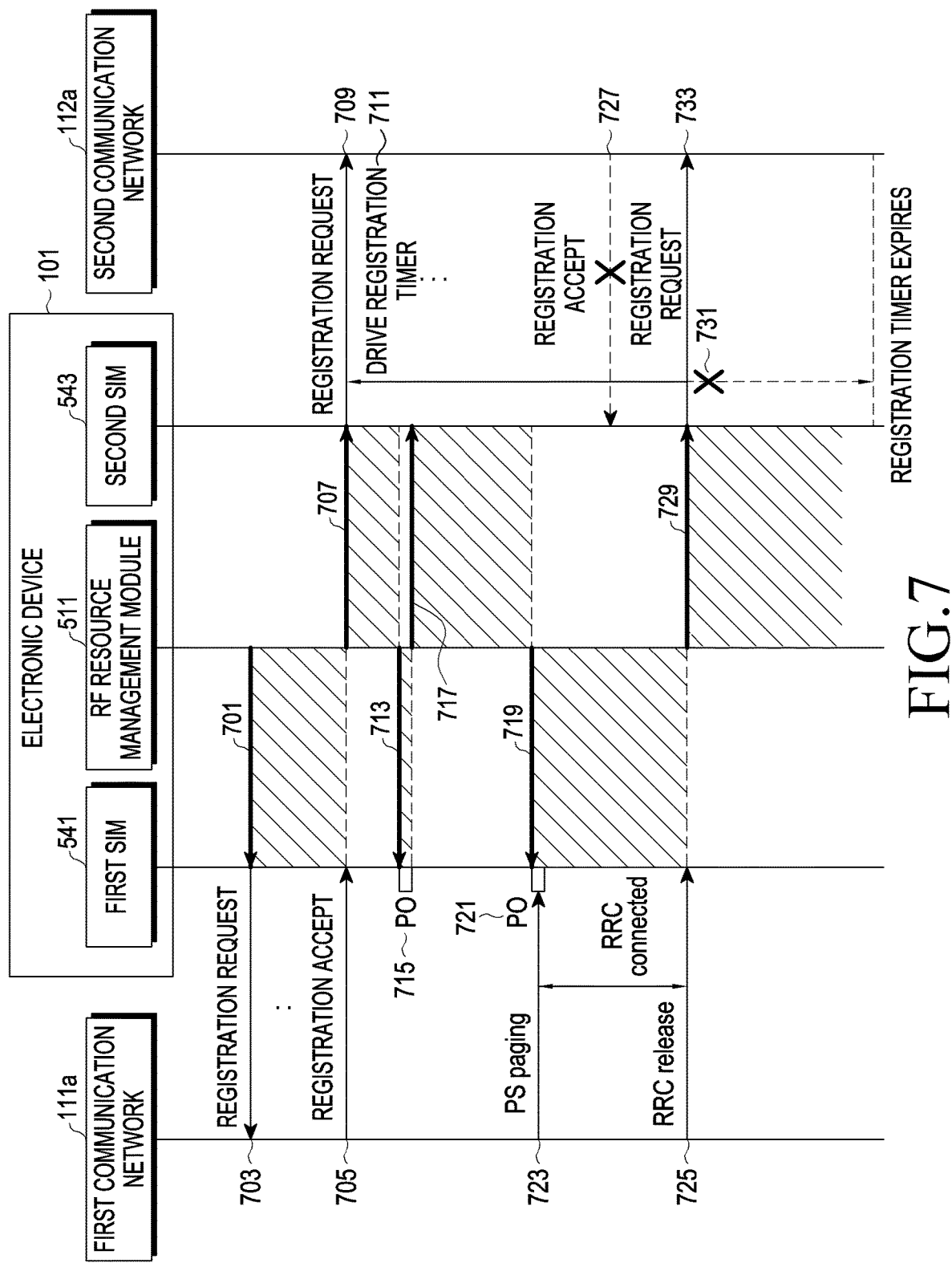
FIG. 7 is a flowchart illustrating operations for registering in a communication network by an electronic device according to an embodiment of the disclosure.

FIG. 7 is a flowchart illustrating operations for registering in a communication network by an electronic device according to an embodiment of the disclosure.

Referring to FIG. 7, the electronic device 101 may include a first SIM 541 and a second SIM 543. According to various embodiments of the disclosure, the electronic device 101 may support DSDS that allows any one of the first SIM 541 or the second SIM 543 to use an RF resource. For example, the RF resource management module 511 of the electronic device 101 may allocate the RF resource to the first SIM 541 or the second SIM 543 according to a set algorithm or a set priority. The first SIM 541 may have subscription to the first communication 111a to register in the first communication network 111a, and the second SIM 543 may have subscription to the second communication network 111b to register in the second communication network 111b, but embodiments of the disclosure are not limited thereto. The first communication network 111a may include at least one communication network of 5G, LTE, WCDMA, or GSM. The second communication network 111b may include at least one communication network of 5G, LTE, WCDMA, or GSM.

The first SIM 541 or the second SIM 543 may be set as a data-only SIM or a non-data-only SIM. For example, if the first SIM 541 is set as a data-only SIM, the second SIM 543 may be configured as a non-data-only SIM. If the first SIM 541 is set as a non-data-only SIM, the second SIM 543 may be set as a data-only SIM. The data-only SIM or the non-data-only SIM may be implemented to be set by the user through a SIM setting menu. According to various embodiments of the disclosure, although it is assumed in FIG. 7 that the first SIM 541 is as a non-data-only SIM, and the second SIM 543 is set as a data-only SIM, embodiments are not limited thereto.

According to various embodiments of the disclosure, the RF resource management module 511 of the electronic device 101 may perform control to perform a registration procedure for the first SIM 541, set as a non-data-only SIM, preferentially over a registration procedure for the second SIM, according to the setting. Referring to FIG. 7, the RF resource management module 511 of the electronic device 101 may allocate the use of an RF circuit (or RF resource) to the first SIM 541 in operation 601. If the use of the RF circuit is allocated to the first SIM 541 as the electronic device 101 supports DSDS, the second SIM 543 may be set not to use the RF circuit. According to various embodiments of the disclosure, operations 701, 703, 705, 707, 709, 711, 713, 715, 717, 719, and 721 described below may be identical or similar to operations 603, 605, 607, 609, 611, 613, 615, 617, 619, and 621 of FIG. 6, but a detailed description thereof is omitted.

According to various embodiments of the disclosure, in operation 723, the first communication network 111a may transmit a paging signal (e.g., voice call paging or packet data paging) to the electronic device 101. The electronic device 101 may identify the paging signal transmitted from the first communication network 111a to the electronic device 101 at the PO of 721. As the paging signal is identified, the electronic device 101 may be switched to an RRC connected state to transmit/receive data to/from the first communication network 111a. For example, the electronic device 101 may receive multimedia message service (MMS) data or background app-related data transmitted from the outside in the RRC connected state. According to various embodiments of the disclosure, in the RRC connected state of the electronic device 101 with the first communication network 111a, the RF resource management module 511 may perform control so that use of the RF circuit allocated to the first SIM 541 is maintained. According to various embodiments of the disclosure, the registration procedure of the second SIM 543 may be stopped while the RRC connected state for the first SIM 541 is maintained. For example, in operation 727, the second SIM 543 does not receive the registration accept transmitted from the second communication network 112a and may thus fail in normal registration.

According to various embodiments of the disclosure, the electronic device 101 may receive an RRC release message from the first communication network 111a in operation 725. The RF resource management module 511 of the electronic device 101 may switch the use of the RF circuit allocated to the first SIM 541 to the second SIM 543 in response to receiving the RRC release message. For example, the RF resource management module 511 of the electronic device 101 may perform control so that the use of the RF circuit is allocated to the second SIM 543 in operation 729.

According to various embodiments of the disclosure, if the use of the RF circuit is allocated to the second SIM 543 in the RF resource management module 511 of the electronic device 101, the electronic device 101 may retransmit a registration request to the second communication network 112a even before the registration timer expires in operation 733. The electronic device 101 may prevent delay in registration of the second SIM 543 due to the registration timer by retransmitting a registration request before the registration timer expires. According to various embodiments of the disclosure, the electronic device 101 may reset, initialize, or restart the registration timer in operation 731 together with retransmission of the registration request.

Operation methods of the electronic device 101 according to various embodiments are described below with reference to FIGS. 8, 9, 10A, 10B, 11, and 12. The methods described below may be performed through the electronic device 101 of FIGS. 1A, 1B, 2A, 2B, 3A, 3B, and 3C.

Figure 8:
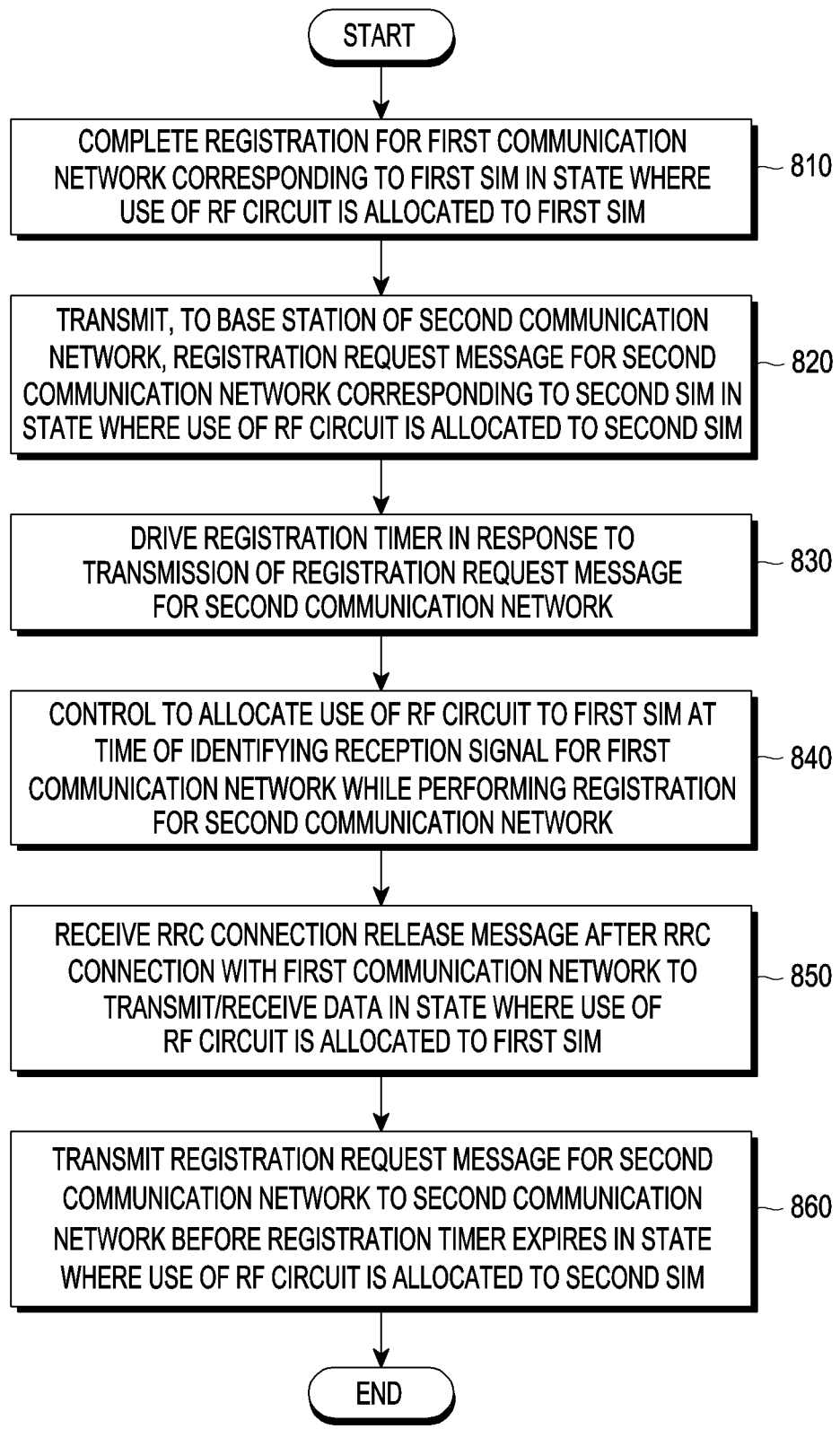
FIG. 8 is a flowchart illustrating operations for registering in a communication network by an electronic device according to an embodiment of the disclosure.

FIG. 8 is a flowchart illustrating operations for registering in a communication network by an electronic device according to an embodiment of the disclosure.

Referring to FIG. 8, according to various embodiments of the disclosure, the electronic device 101 may complete registration in the first communication network corresponding to the first SIM in a state where the use of the RF circuit (e.g., RF device) is allocated to the first SIM in operation 810. The first communication network may include at least one communication network of 5G, LTE, WCDMA, or GSM. For example, assuming that the first communication network is a 5G network, the registration procedure may include at least one of operations between the registration request and the registration accept. As another example, assuming that the first communication network is an LTE network, at least one of the operations between the attach request and the attach accept may be included. According to various embodiments of the disclosure, the registration procedure may include at least one operation of a registration request, an RRC connection request, an RRC setup, an RRC connection complete, an authentication request, an authentication response, a security request, a security response, a UE capability enquiry, and UE capability information transmission.

According to various embodiments of the disclosure, the electronic device 101 may transmit a registration request message for the second communication network corresponding to the second SIM to the base station of the second communication network in a state in which the use of the RF circuit is allocated to the second SIM in operation 820.

According to various embodiments of the disclosure, the electronic device 101 may drive the registration timer in response to transmitting the registration request message for the second communication network in operation 830. The registration timer may include, but is not limited to, a T3510 and/or a T3511 timer defined in 3GPP standard document TS 24.501 10.2. The registration timer may be a timer for retransmission of a registration request when registration is not normally performed after the registration request. For example, the electronic device 101 may drive the registration timer while transmitting a registration request to the second communication network 112a and, although registration fails before the timer expires, may retransmit a registration request after the timer expires.

According to various embodiments of the disclosure, the electronic device 101 may perform control so that the use of the RF circuit is allocated to the first SIM at the time of identifying a received signal for the first communication network while performing registration for the second communication network in operation 840.

According to various embodiments of the disclosure, the electronic device 101 may receive an RRC connection release message after transmitting and receiving data by RRC connection with the first communication network in a state in which the use of the RF circuit is allocated to the first SIM in operation 850.

According to various embodiments of the disclosure, the electronic device 101 may transmit a registration request message for the second communication network to the base station of the second communication network in a state in which the use of the RF circuit is allocated to the second SIM in operation 860. According to various embodiments of the disclosure, the electronic device 101 may reset, initialize, or restart the registration timer.

Figure 9:
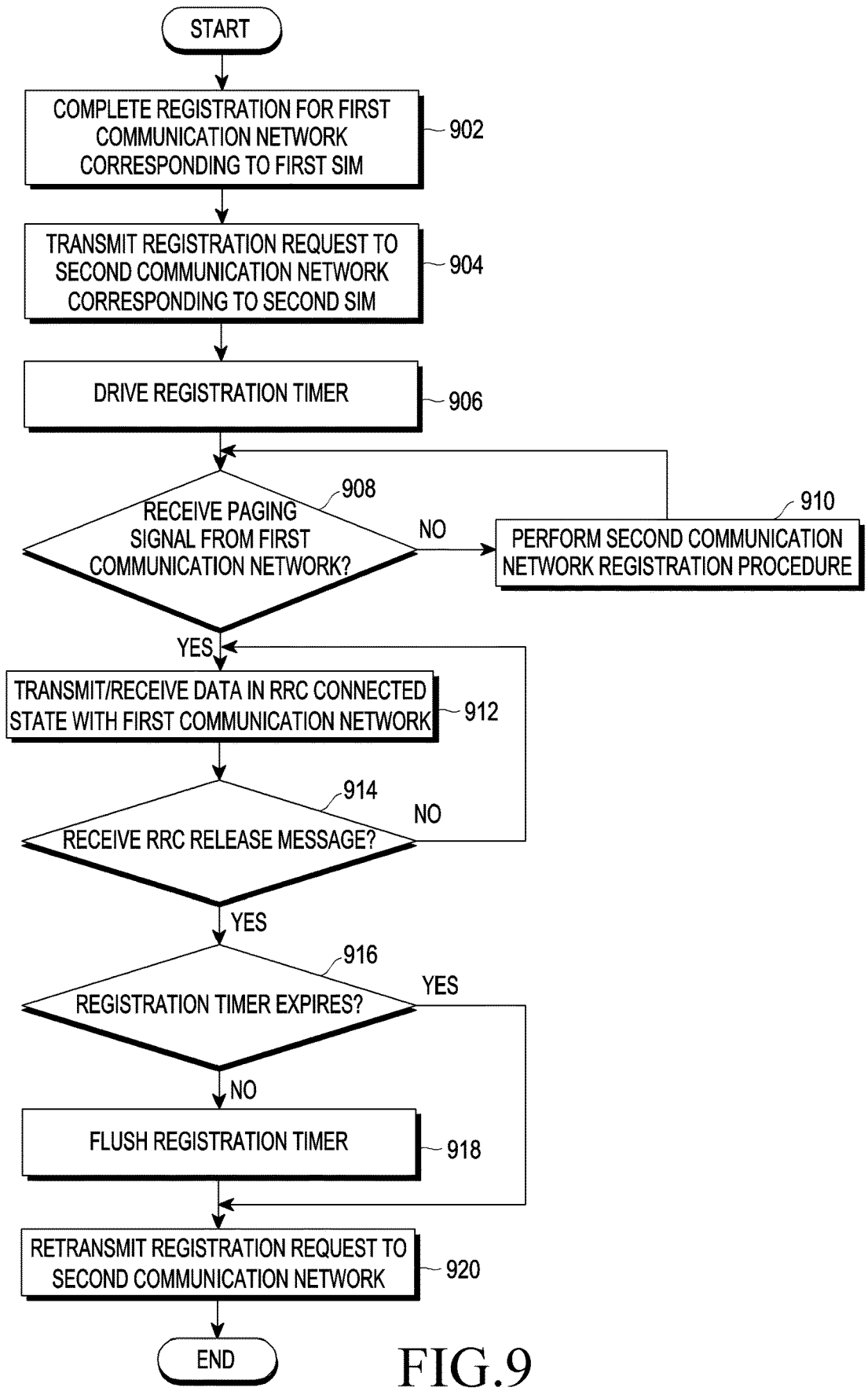
FIG. 9 is a flowchart illustrating operations for registering in a communication network by an electronic device according to an embodiment of the disclosure.

FIG. 9 is a flowchart illustrating a method for registering in a communication network by an electronic device according to an embodiment of the disclosure.

Referring to FIG. 9, according to various embodiments of the disclosure, the electronic device 101 may complete registration in the first communication network corresponding to the first SIM in a state where the use of the RF circuit is allocated to the first SIM in operation 902. The first communication network may include at least one communication network of 5G, LTE, WCDMA, or GSM. For example, assuming that the first communication network is a 5G network, the registration procedure may include at least one of operations between the registration request and the registration accept. As another example, assuming that the first communication network is an LTE network, at least one of the operations between the attach request and the attach accept may be included. According to various embodiments of the disclosure, the registration procedure may include at least one operation of a registration request, an RRC connection request, an RRC setup, an RRC connection complete, an authentication request, an authentication response, a security request, a security response, a UE capability enquiry, and UE capability information transmission.

According to various embodiments of the disclosure, the electronic device 101 may transmit a registration request to the second communication network corresponding to the second SIM in operation 904. The electronic device 101 may drive the registration timer in operation 906 according to the transmission of the registration request. The registration timer may include, but is not limited to, a T3510 and/or a T3511 timer defined in 3GPP standard document TS 24.501 10.2. The registration timer may be a timer for retransmission of a registration request when registration is not normally performed after the registration request. For example, the electronic device 101 may drive the registration timer while transmitting a registration request to the second communication network 112a and, although registration fails before the timer expires, may retransmit a registration request after the timer expires.

According to various embodiments of the disclosure, in operation 908, the electronic device 101 may identify whether a paging signal is received from the first communication network in the PO period. If the paging signal is not received from the first communication network in the PO period (No in operation 908), the electronic device 101 may continue to perform the registration procedure for the second communication network in operation 910.

According to various embodiments of the disclosure, if receiving a paging signal from the first communication network in the PO section (Yes in operation 908), the electronic device 101 may transmit/receive data to/from the first communication network in an RRC connected state in operation 912. According to various embodiments of the disclosure, if transmission and reception of the data is completed, the electronic device 101 may identify whether an RRC release message is received in operation 914. For example, if the electronic device 101 does not receive the RRC release message in operation 914 (No in operation 914), the electronic device 101 may transmit/receive data while maintaining the RRC connected state. In operation 914, upon receiving the RRC release message (Yes in operation 914), the electronic device 101 may release the RRC connection and allocate an RF circuit to the second SIM.

According to various embodiments of the disclosure, in operation 916, the electronic device 101 may identify whether the registration timer driven in response to the registration request of the second SIM expires. According to various embodiments of the disclosure, if the registration timer does not expire (No in operation 916), the electronic device 101 may reset, initialize, or restart the registration timer in operation 918. According to various embodiments of the disclosure, the electronic device 101 may retransmit a registration request to the second communication network without waiting until the registration timer expires in operation 920. According to various embodiments of the disclosure, if the registration timer expires (Yes in operation 916), the electronic device 101 may retransmit a registration request to the second communication network as the registration timer expires in operation 920.

Figure 10A:
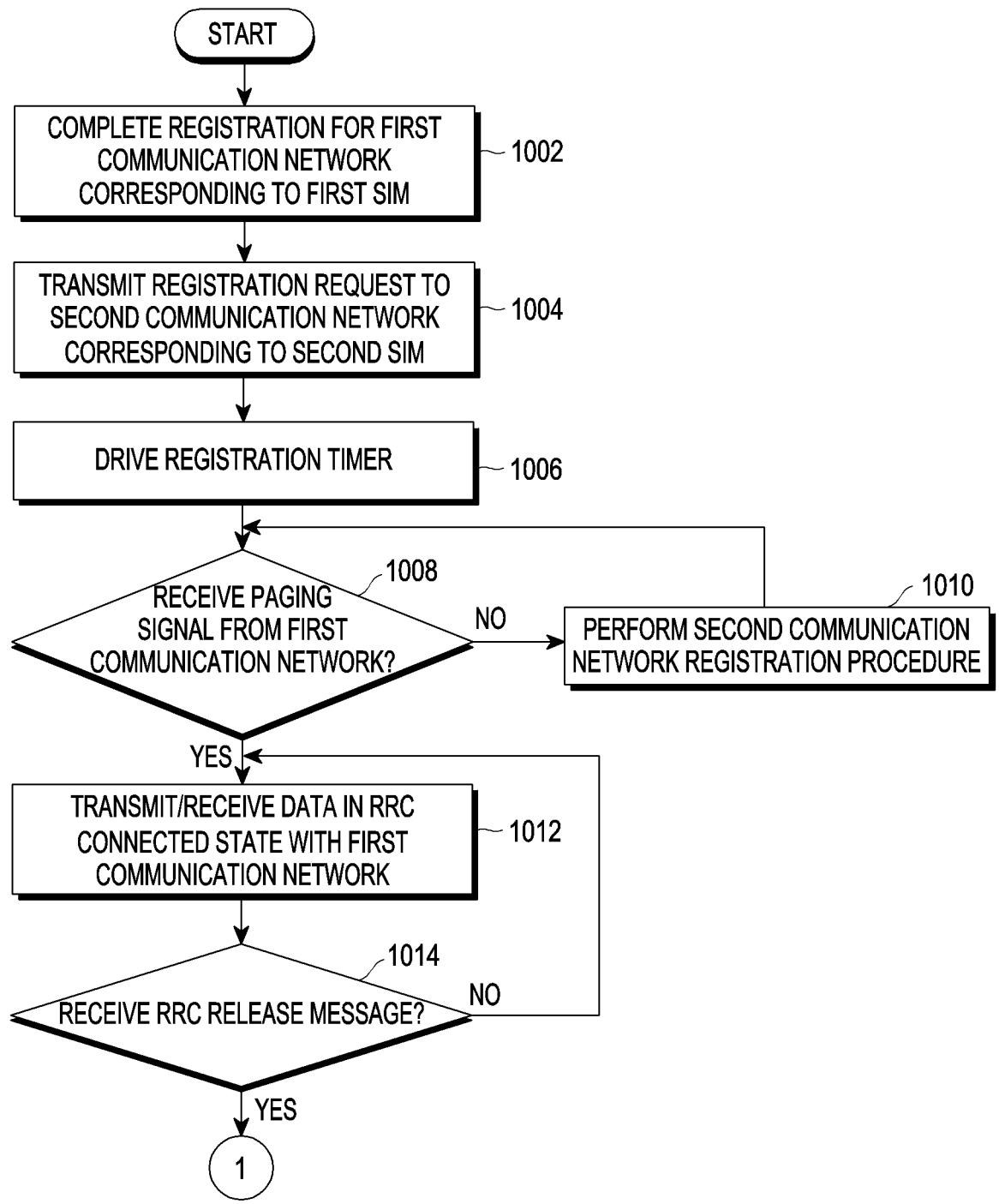
FIGS. 10A and 10B are flowcharts illustrating operations for registering in a communication network by an electronic device according to various embodiments of the disclosure.
Figure 10B:
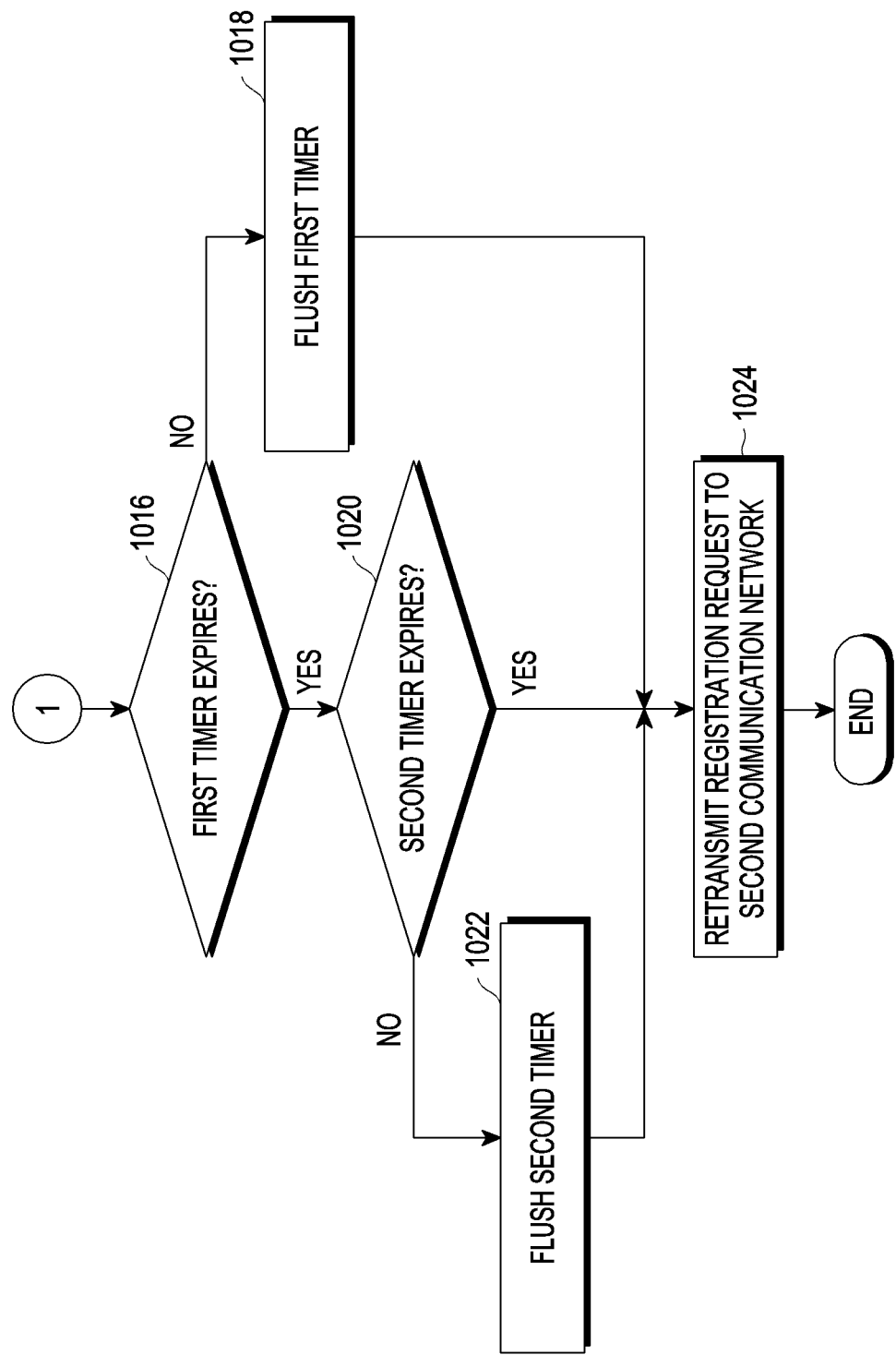

FIGS. 10A and 10B are flowcharts illustrating operations for registering in a communication network by an electronic device according to various embodiments of the disclosure.

Referring to FIGS. 10A and 10B, according to various embodiments of the disclosure, the electronic device 101 may complete registration in the first communication network corresponding to the first SIM in a state where the use of the RF circuit is allocated to the first SIM in operation 1002. The first communication network may include at least one communication network of 5G, LTE, WCDMA, or GSM. For example, assuming that the first communication network is a 5G network, the registration procedure may include at least one of operations between the registration request and the registration accept. As another example, assuming that the first communication network is an LTE network, at least one of the operations between the attach request and the attach accept may be included. According to various embodiments of the disclosure, the registration procedure may include at least one operation of a registration request, an RRC connection request, an RRC setup, an RRC connection complete, an authentication request, an authentication response, a security request, a security response, a UE capability enquiry, and UE capability information transmission.

According to various embodiments of the disclosure, the electronic device 101 may transmit a registration request to the second communication network corresponding to the second SIM in operation 1004. The electronic device 101 may drive the registration timer in operation 1006 according to the transmission of the registration request. The registration timer may include, but is not limited to, a T3510 and/or a T3511 timer defined in 3GPP standard document TS 24.501 10.2. The registration timer may be a timer for retransmission of a registration request when registration is not normally performed after the registration request. For example, the electronic device 101 may drive the registration timer while transmitting a registration request to the second communication network 112a and, although registration fails before the timer expires, may retransmit a registration request after the timer expires.

According to various embodiments of the disclosure, in operation 1008, the electronic device 101 may identify whether a paging signal is received from the first communication network in the PO period. If the paging signal is not received from the first communication network in the PO period (No in operation 1008), the electronic device 101 may continue to perform the registration procedure for the second communication network in operation 1010.

According to various embodiments of the disclosure, if receiving a paging signal (e.g., voice call paging or packet data paging) from the first communication network in the PO section (Yes in operation 1008), the electronic device 101 may transmit/receive data to/from the first communication network in an RRC connected state in operation 1012. According to various embodiments of the disclosure, if transmission and reception of the data is completed, the electronic device 101 may identify whether an RRC release message is received in operation 1014. For example, if the electronic device 101 does not receive the RRC release message in operation 1014 (No in operation 1014), the electronic device 101 may transmit/receive data while maintaining the RRC connected state. In operation 1014, upon receiving the RRC release message (Yes in operation 1014), the electronic device 101 may release the RRC connection and allocate an RF circuit to the second SIM.

According to various embodiments of the disclosure, in operation 1016, the electronic device 101 may identify whether, among the registration timers driven in response to the registration request of the second SIM, a first timer expires. According to various embodiments of the disclosure, if the first timer does not expire (No in operation 1016), the electronic device 101 may reset, initialize, or restart the first timer in operation 1018 and then retransmit a registration request to the second communication network in operation 1024.

According to various embodiments of the disclosure, if the first timer expires (Yes in operation 1016), the electronic device 101 may identify whether a second timer expires in operation 1020. According to various embodiments of the disclosure, if the second timer does not expire (No in operation 1020), the electronic device 101 may reset, initialize, or restart the second timer in operation 1022 and then retransmit a registration request to the second communication network in operation 1024.

According to various embodiments of the disclosure, if the second timer expires (Yes in operation 1020), the electronic device 101 may retransmit a registration request to the second communication network in operation 1024.

Figure 11:
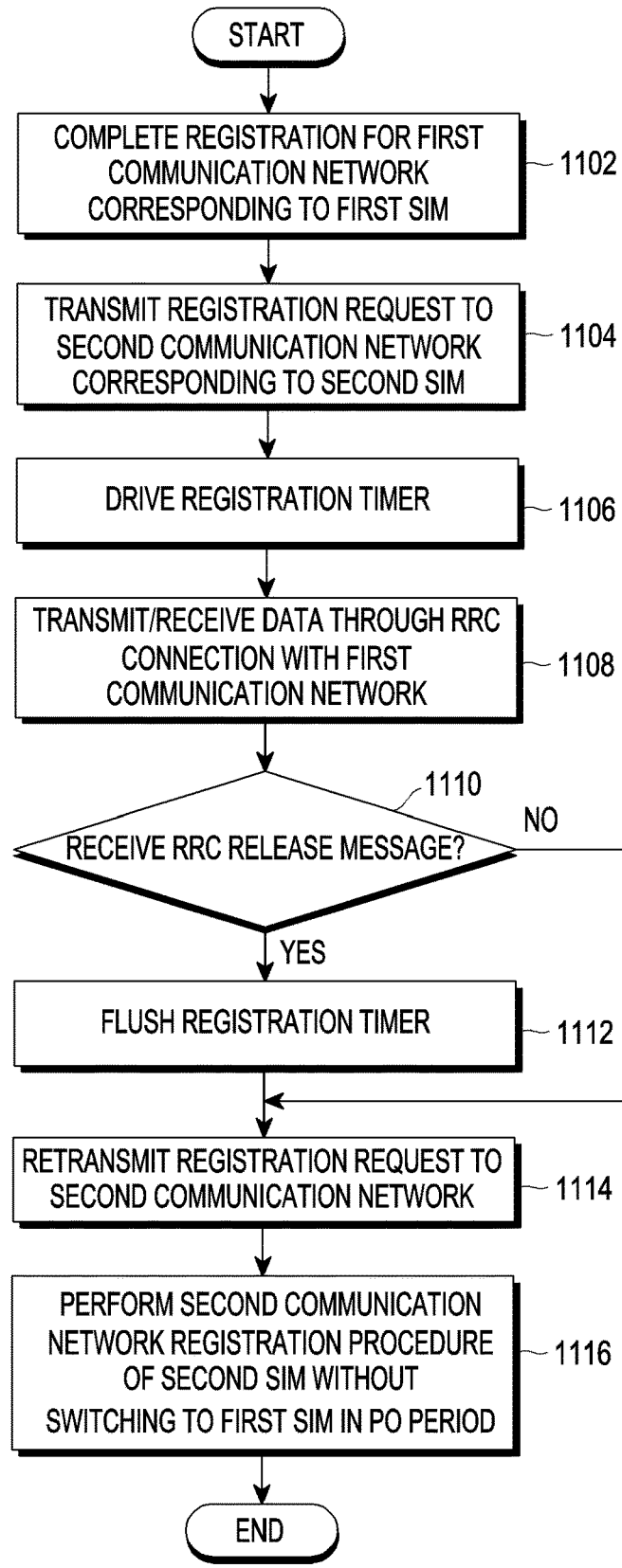
FIG. 11 is a flowchart illustrating operations for registering in a communication network by an electronic device according to an embodiment of the disclosure.

FIG. 11 is a flowchart illustrating operations for registering in a communication network by an electronic device according to an embodiment of the disclosure.

Referring to FIG. 11, according to various embodiments of the disclosure, the electronic device 101 may complete registration in the first communication network corresponding to the first SIM in a state where the use of the RF circuit is allocated to the first SIM in operation 1102. The first communication network may include at least one communication network of 5G, LTE, WCDMA, or GSM. For example, assuming that the first communication network is a 5G network, the registration procedure may include at least one of operations between the registration request and the registration accept. As another example, assuming that the first communication network is an LTE network, at least one of the operations between the attach request and the attach accept may be included. According to various embodiments of the disclosure, the registration procedure may include at least one operation of a registration request, an RRC connection request, an RRC setup, an RRC connection complete, an authentication request, an authentication response, a security request, a security response, a UE capability enquiry, and UE capability information transmission.

According to various embodiments of the disclosure, the electronic device 101 may transmit a registration request to the second communication network corresponding to the second SIM in operation 1104. The electronic device 101 may drive the registration timer in operation 1106 according to the transmission of the registration request. The registration timer may include, but is not limited to, a T3510 and/or a T3511 timer defined in 3GPP standard document TS 24.501 10.2. The registration timer may be a timer for retransmission of a registration request when registration is not normally performed after the registration request. For example, the electronic device 101 may drive the registration timer while transmitting a registration request to the second communication network 112a and, although registration fails before the timer expires, may retransmit a registration request after the timer expires.

According to various embodiments of the disclosure, if receiving a paging signal from the first communication network in the PO section, the electronic device 101 may RRC-connect with the first communication network and transmit/receive data in operation 1108.

According to various embodiments of the disclosure, if transmission and reception of the data is completed, the electronic device 101 may identify whether an RRC release message is received in operation 1110. For example, if the electronic device 101 does not receive the RRC release message in operation 1110 (No in operation 1110), the electronic device 101 may transmit/receive data while maintaining the RRC connected state. In operation 1110, upon receiving the RRC release message (Yes in operation 1110), the electronic device 101 may release the RRC connection and allocate an RF circuit to the second SIM.

According to various embodiments of the disclosure, if the registration timer driven in response to the registration request of the second SIM does not expire, the electronic device 101 may reset, initialize, or restart the registration timer in operation 1112. According to various embodiments of the disclosure, the electronic device 101 may retransmit a registration request to the second communication network without waiting until the registration timer expires in operation 1114. According to various embodiments of the disclosure, after retransmitting the registration request, the electronic device 101 may perform a second communication network registration procedure of the second SIM without switching to the first SIM in the PO period for the first SIM.

Figure 12:
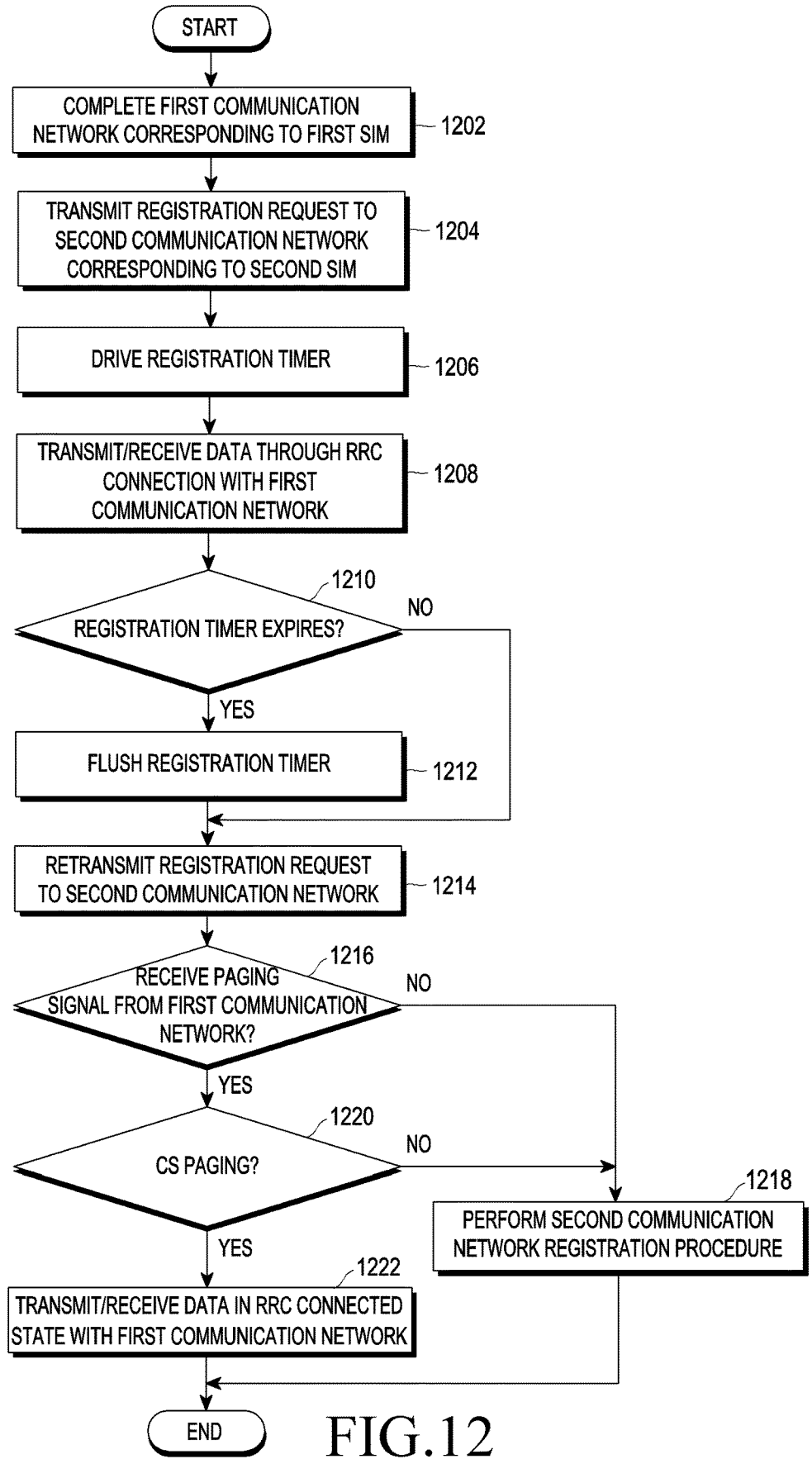
FIG. 12 is a flowchart illustrating a method for registering in a communication network by an electronic device according to an embodiment of the disclosure.

FIG. 12 is a flowchart illustrating a method for registering in a communication network by an electronic device according to an embodiment of the disclosure.

Referring to FIG. 12, according to various embodiments of the disclosure, the electronic device 101 may complete registration in the first communication network corresponding to the first SIM in a state where the use of the RF circuit is allocated to the first SIM in operation 1202. The first communication network may include at least one communication network of 5G, LTE, WCDMA, or GSM. For example, assuming that the first communication network is a 5G network, the registration procedure may include at least one of operations between the registration request and the registration accept. As another example, assuming that the first communication network is an LTE network, at least one of the operations between the attach request and the attach accept may be included. According to various embodiments of the disclosure, the registration procedure may include at least one operation of a registration request, an RRC connection request, an RRC setup, an RRC connection complete, an authentication request, an authentication response, a security request, a security response, a UE capability enquiry, and UE capability information transmission.

According to various embodiments of the disclosure, the electronic device 101 may transmit a registration request to the second communication network corresponding to the second SIM in operation 1204. The electronic device 101 may drive the registration timer in operation 1206 according to the transmission of the registration request. The registration timer may include, but is not limited to, a T3510 and/or a T3511 timer defined in 3GPP standard document TS 24.501 10.2. The registration timer may be a timer for retransmission of a registration request when registration is not normally performed after the registration request. For example, the electronic device 101 may drive the registration timer while transmitting a registration request to the second communication network 112a and, although registration fails before the timer expires, may retransmit a registration request after the timer expires.

According to various embodiments of the disclosure, if receiving a paging signal from the first communication network in the PO section, the electronic device 101 may RRC-connect with the first communication network and transmit/receive data in operation 1208.

According to various embodiments of the disclosure, if transmission and reception of the data is completed, the electronic device 101 may identify whether an RRC release message is received in operation 1210. For example, if the electronic device 101 does not receive the RRC release message in operation 1210 (No in operation 1210), the electronic device 101 may transmit/receive data while maintaining the RRC connected state. In operation 1210, upon receiving the RRC release message (Yes in operation 1210), the electronic device 101 may release the RRC connection and allocate an RF circuit to the second SIM.

According to various embodiments of the disclosure, if the registration timer driven in response to the registration request of the second SIM does not expire, the electronic device 101 may reset, initialize, or restart the registration timer in operation 1212. According to various embodiments of the disclosure, the electronic device 101 may retransmit a registration request to the second communication network without waiting until the registration timer expires in operation 1214.

According to various embodiments of the disclosure, after retransmitting the registration request, the electronic device 101 may identify whether a paging signal is received from the first communication network in the PO period for the first SIM in operation 1216. As a result of the identification, if a paging signal is not received (No in operation 1216), the second communication network registration procedure may be continuously performed in operation 1218. As a result of the identification, if a paging signal is received (Yes in operation 1216), it may be identified whether the paging is for a voice call service in operation 1220. If the paging is for a voice call service as a result of the identification (Yes in operation 1220), the electronic device 101 may transmit/receive data to/from the first communication network in the RRC connected state in operation 1222. As a result of the identification, if the paging is not for the voice call service (No in operation 1220) (e.g., if the paging is for a packet service), the electronic device 101 may continuously perform the second communication network registration procedure in operation 1218.

According to any one of various embodiments of the disclosure, an electronic device may comprise at least one processor (e.g., communication processor) connected with a first subscriber identity module (SIM) and a second SIM and at least one radio frequency (RF) circuit used for communication based on the first SIM and communication based on the second SIM. The at least one processor may be configured to complete registration for a first communication network corresponding to the first SIM in a state where use of the at least one RF circuit is allocated to the first SIM, control to transmit a registration request message for a second communication network corresponding to the second SIM to a base station of the second communication network in a state where the use of the at least one RF circuit is allocated to the second SIM, control to allocate the use of the at least one RF circuit to the first SIM at a time of identifying a reception signal for the first communication network while performing the registration for the second communication network, receive an RRC connection release message after radio resource control (RRC) connection with the first communication network to transmit/receive data in the state where the use of the at least one RF circuit is allocated to the first SIM, and retransmit a registration request message for the second communication network to the base station of the second communication network in the state where the use of the at least one RF circuit is allocated to the second SIM in response to the reception of the RRC connection release message.

According to various embodiments of the disclosure, the first communication network may include at least one communication network of 5G, LTE, WCDMA, or GSM.

According to various embodiments of the disclosure, the second communication network may include at least one communication network of 5G, LTE, WCDMA, or GSM.

According to various embodiments of the disclosure, the at least one processor may be configured to drive a registration timer in response to transmission of the registration request message for the second communication network, and control to retransmit the registration request message for the second communication network to the base station of the second communication network, before the registration timer expires, in response to reception of the RRC connection release message.

According to various embodiments of the disclosure, the at least one processor may be configured to reset the registration timer, before the registration timer expires, in response to reception of the RRC connection release message.

According to various embodiments of the disclosure, the registration timer may include a first timer and a second timer.

According to various embodiments of the disclosure, the at least one processor may be configured to control to retransmit the registration request message for the second communication network to the base station of the second communication network, if the registration timer is in a state of having expired, in response to reception of the RRC connection release message.

According to various embodiments of the disclosure, the at least one processor may be configured to control not to allocate the use of the at least one RF circuit to the first SIM, at the time of identifying the reception signal for the first communication network, while performing the registration for the second communication network, after retransmitting the registration request message for the second communication network to the base station of the second communication network.

According to various embodiments of the disclosure, the at least one processor may be configured to control to allocate the use of the at least one RF circuit to the first SIM, at the time of identifying the reception signal for the first communication network, while performing the registration for the second communication network, after retransmitting the registration request message for the second communication network to the base station of the second communication network and control to transmit/receive the data through the radio resource control (RRC) connection, if a signal received from the first communication network in the state where the use of the at least one RF circuit is allocated to the first SIM is a paging signal for a voice call service.

According to various embodiments of the disclosure, the at least one processor may be configured to control to allocate the use of the at least one RF circuit to the first SIM, at the time of identifying the reception signal for the first communication network, while performing the registration for the second communication network, after retransmitting the registration request message for the second communication network to the base station of the second communication network and control to perform a registration procedure for the second communication network, in the state where the use of the at least one RF circuit is allocated to the second SIM, if a signal received from the first communication network in the state where the use of the at least one RF circuit is allocated to the first SIM is a paging signal for a packet data service.

According to any one of various embodiments of the disclosure, a method for registering in a communication network by an electronic device including at least one processor connected with a first subscriber identity module (SIM) and a second SIM and at least one radio frequency (RF) circuit used for communication based on the first SIM and communication based on the second SIM may comprise completing registration for a first communication network corresponding to the first SIM in a state where use of the at least one RF circuit is allocated to the first SIM, transmitting a registration request message for a second communication network corresponding to the second SIM to a base station of the second communication network in a state where the use of the at least one RF circuit is allocated to the second SIM, controlling to allocate the use of the at least one RF circuit to the first SIM at a time of identifying a reception signal for the first communication network while performing the registration for the second communication network, receiving an RRC connection release message after radio resource control (RRC) connection with the first communication network to transmit/receive data in the state where the use of the at least one RF circuit is allocated to the first SIM, and retransmitting a registration request message for the second communication network to the base station of the second communication network in the state where the use of the at least one RF circuit is allocated to the second SIM in response to the reception of the RRC connection release message.

According to various embodiments of the disclosure, the first communication network may include at least one communication network of 5G, LTE, WCDMA, or GSM.

According to various embodiments of the disclosure, the second communication network may include at least one communication network of 5G, LTE, WCDMA, or GSM.

According to various embodiments of the disclosure, the method may further comprise driving a registration timer in response to transmission of the registration request message for the second communication network, and retransmitting the registration request message for the second communication network to the base station of the second communication network, before the registration timer expires, in response to reception of the RRC connection release message.

According to various embodiments of the disclosure, the method may further comprise resetting the registration timer, before the registration timer expires, in response to reception of the RRC connection release message.

According to various embodiments of the disclosure, the registration timer may include a first timer and a second timer.

According to various embodiments of the disclosure, the method may further comprise retransmitting the registration request message for the second communication network to the base station of the second communication network, if the registration timer is in a state of having expired, in response to reception of the RRC connection release message.

According to various embodiments of the disclosure, the method may further comprise controlling not to allocate the use of the at least one RF circuit to the first SIM, at the time of identifying the reception signal for the first communication network, while performing the registration for the second communication network, after retransmitting the registration request message for the second communication network to the base station of the second communication network.

According to various embodiments of the disclosure, the method may further comprise controlling to allocate the use of the at least one RF circuit to the first SIM, at the time of identifying the reception signal for the first communication network, while performing the registration for the second communication network, after retransmitting the registration request message for the second communication network to the base station of the second communication network and transmitting/receiving the data through the radio resource control (RRC) connection, if a signal received from the first communication network in the state where the use of the at least one RF circuit is allocated to the first SIM is a paging signal for a voice call service.

According to various embodiments of the disclosure, the method may further comprise controlling to allocate the use of the at least one RF circuit to the first SIM, at the time of identifying the reception signal for the first communication network, while performing the registration for the second communication network, after retransmitting the registration request message for the second communication network to the base station of the second communication network and controlling to perform a registration procedure for the second communication network, in the state where the use of the at least one RF circuit is allocated to the second SIM, if a signal received from the first communication network in the state where the use of the at least one RF circuit is allocated to the first SIM is a paging signal for a packet data service.

The electronic device according to various embodiments of the disclosure may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program) including one or more instructions that are stored in a storage medium (e.g., an internal memory 136 or an external memory 138) that is readable by a machine (e.g., a master device or a device performing tasks). For example, a processor of the machine (e.g., a master device or a device performing tasks) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

The invention claimed is:

1. An electronic device comprising:
   at least one processor including a radio frequency (RF) resource management module, the at least one processor connected with a first subscriber identity module (SIM) and a second SIM; and
   at least one RF circuit used for communication based on the first SIM and communication based on the second SIM,
   wherein the at least one processor is configured to:
      complete registration for a first communication network corresponding to the first SIM in a state where use of the at least one RF circuit is allocated to the first SIM, wherein the first communication network includes a first base station,
      control, at a specific time, one of the first SIM or the second SIM to use RF resource of the at least one RF circuit corresponding to a priority or a set algorithm,
      transmit, to a second base station of a second communication network, a registration request message for the second communication network corresponding to the second SIM in a state where the use of the at least one RF circuit is allocated to the second SIM,
      in response to transmission of the registration request message for the second communication network, drive a first registration timer for the second communication network, and in case that the first registration timer expires, drive a second registration timer for the second communication network,
   allocate the use of the at least one RF circuit from the second SIM to the first SIM at a time of identifying a paging message from the first base station of the first communication network while performing a registration procedure for the second communication network,
   receive, from the first base station of the first communication network, a radio resource control (RRC) connection release message after RRC connection with the first communication network to transmit/receive data in the state where the use of the at least one RF circuit is allocated to the first SIM and where the registration procedure for the second communication network is stopped, and
   in response to the reception of the RRC connection release, message from the first base station of the first communication network, and in case that the first registration timer for the second communication network has not expired:
      reset the first registration timer and retransmit, to the second base station of the second communication network, the registration request message for the second communication network without waiting for expiration of the first registration timer, in the state where the use of the at least one RF circuit is allocated to the second SIM, and
   in response to the reception of the RRC connection release message from the first base station of the first communication network, and in case that the first registration timer expires and the second registration timer has not expired:
      reset the second registration timer and retransmit, to the second base station of the second communication network, the registration request message for the second communication network without waiting for expiration of the second registration timer, in the state where the use of the at least one RF circuit is allocated to the second SIM.

2. The electronic device of claim 1, wherein the first communication network includes at least one communication network of 5$^{th}$ generation (5G), long term evolution (LTE), wideband code division multiple access (WCDMA), or global system for mobile communications (GSM).

3. The electronic device of claim 1, wherein the second communication network includes at least one communication network of 5$^{th}$ generation (5G), long term evolution (LTE), wideband code division multiple access (WCDMA), or global system for mobile communications (GSM).

4. The electronic device of claim 1, wherein the at least one processor is further configured to:
in response to reception of the RRC connection release message, retransmit the registration request message for the second communication network to the second base station of the second communication network, in case that the second registration timer is in a state of having expired.

5. The electronic device of claim 1, wherein the use of the at least one RF circuit is not allocated to the first SIM, at the time of identifying the paging message from the first base station of the first communication network, while performing the registration for the second communication network, after retransmitting the registration request message for the second communication network to the second base station of the second communication network.

6. The electronic device of claim 1, wherein the at least one processor is further configured to:
allocate the use of the at least one RF circuit to the first SIM, at the time of identifying the paging message from the first base station of the first communication network, while performing the registration for the second communication network, after retransmitting the registration request message for the second communication network to the second base station of the second communication network; and
transmit and receive the data through the RRC connection, in case that a signal received from the first communication network in the state where the use of the at least one RF circuit is allocated to the first SIM is a paging signal for a voice call service.

7. The electronic device of claim 1, wherein the at least one processor is further configured to:
allocate the use of the at least one RF circuit to the first SIM, at the time of identifying the paging message from the first base station of the first communication network, while performing the registration for the second communication network, after retransmitting the registration request message for the second communication network to the second base station of the second communication network; and
perform a registration procedure for the second communication network, in the state where the use of the at least one RF circuit is allocated to the second SIM, in case that a signal received from the first communication network in the state where the use of the at least one RF circuit is allocated to the first SIM is a paging signal for a packet data service.

8. A method for registering in a communication network by an electronic device including at least one processor including a radio resource management module, the at least one processor, connected with a first subscriber identity module (SIM) and a second SIM and at least one RF circuit used for communication based on the first SIM and communication based on the second SIM, the method comprising:
completing registration for a first communication network corresponding to the first SIM in a state where use of the at least one RF circuit is allocated to the first SIM, wherein the first communication network includes a first base station;
controlling, at a specific time, one of the first SIM or the second SIM to use RF resource of the at least one RF circuit corresponding to a priority or a set algorithm;
transmitting, to a second base station of a second communication network, a registration request message for the second communication network corresponding to the second SIM in a state where the use of the at least one RF circuit is allocated to the second SIM;
in response to transmission of the registration request message for the second communication network, driving a first registration timer for the second communication network, and in case that the first registration timer expires, driving a second registration timer for the second communication network;
allocating the use of the at least one RF circuit from the second SIM to the first SIM at a time of identifying a paging message from the first base station of the first communication network while performing a registration procedure for the second communication network;
receiving, from the first base station of the first communication network, a radio resource control (RRC) connection release message after RRC connection with the first communication network to transmit/receive data in the state where the use of the at least one RF circuit is allocated to the first SIM and where the registration procedure for the second communication network is stopped; and
in response to the reception of the RRC connection release message from the first base station of the first communication network, and in case that the first registration timer for the second communication network has not expired:
resetting the first registration timer and retransmitting, to the second base station of the second communication network, the registration request message for the second communication network without waiting for expiration of the first registration timer, in the state where the use of the at least one RF circuit is allocated to the second SIM; and
in response to the reception of the RRC connection release message from the first base station of the first communication network, and in case that the first registration timer expires and the second registration timer has not expired:
resetting the second registration timer and retransmitting, to the second base station of the second communication network, the registration request message for the second communication network without waiting for expiration of the second registration timer, in the state where the use of the at least one RF circuit is allocated to the second SIM.

9. The method of claim 8, wherein the first communication network includes at least one communication network of 5$^{th}$ generation (5G), long term evolution (LTE), wideband code division multiple access (WCDMA), or global system for mobile communications (GSM).

10. The method of claim 8, wherein the second communication network includes at least one communication network of 5$^{th}$ generation (5G), long term evolution (LTE), wideband code division multiple access (WCDMA), or global system for mobile communications (GSM).

11. The method of claim 8, further comprising:

in response to reception of the RRC connection release message, retransmitting the registration request message for the second communication network to the second base station of the second communication network, in case that the second registration timer is in a state of having expired.

12. The method of claim 8, wherein the use of the at least one RF circuit is not allocated to the first SIM, at the time of identifying the paging message from the first base station of the first communication network, while performing the registration for the second communication network, after retransmitting the registration request message for the second communication network to the second base station of the second communication network.

13. The method of claim 8, further comprising:

allocating the use of the at least one RF circuit to the first SIM, at the time of identifying the paging message from the first base station of for the first communication network, while performing the registration for the second communication network, after retransmitting the registration request message for the second communication network to the second base station of the second communication network; and transmitting and receiving the data through the RRC connection, in case that a signal received from the first communication network in the state where the use of the at least one RF circuit is allocated to the first SIM is a paging signal for a voice call service.

14. The method of claim 8, further comprising:

allocating the use of the at least one RF circuit to the first SIM, at the time of identifying the paging message from the first base station of for the first communication network, while performing the registration for the second communication network, after retransmitting the registration request message for the second communication network to the second base station of the second communication network; and performing a registration procedure for the second communication network, in the state where the use of the at least one RF circuit is allocated to the second SIM, in case that a signal received from the first communication network in the state where the use of the at least one RF circuit is allocated to the first SIM is a paging signal for a packet data service.

* * * * *